(12) United States Patent
Takemura

(10) Patent No.: US 10,212,314 B2
(45) Date of Patent: Feb. 19, 2019

(54) IMAGE FORMING APPARATUS WITH COLOR CALIBRATION BY MEASUREMENT IMAGE

(71) Applicant: CANON KABUSHIKI KAISHA, Tokyo (JP)

(72) Inventor: Taichi Takemura, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/226,414

(22) Filed: Aug. 2, 2016

(65) Prior Publication Data
US 2017/0054878 A1    Feb. 23, 2017

(30) Foreign Application Priority Data

Aug. 20, 2015  (JP) .................. 2015-163093

(51) Int. Cl.
*H04N 1/60*    (2006.01)
*H04N 1/028*   (2006.01)
(Continued)

(52) U.S. Cl.
CPC ....... *H04N 1/6041* (2013.01); *G03G 15/5062* (2013.01); *H04N 1/02895* (2013.01);
(Continued)

(58) Field of Classification Search
CPC .. H04N 1/6041; H04N 1/6033; H04N 1/6005; H04N 1/02895; H04N 1/03; H04N 1/6008; G03G 15/5062; G03G 2215/00569

See application file for complete search history.

(56) References Cited

U.S. PATENT DOCUMENTS 6,697,167 B1   2/2004  Takahashi ...................... 358/1.9
6,959,157 B2  10/2005  Nakayama ...................... 399/39
(Continued)

FOREIGN PATENT DOCUMENTS

JP   H11-11718   1/1999
JP   H11-75067   3/1999
(Continued)

OTHER PUBLICATIONS

U.S. Appl. No. 15/217,720, filed Jul. 22, 2016.

*Primary Examiner* — Christopher D Wait
(74) *Attorney, Agent, or Firm* — Venable LLC

(57) ABSTRACT

In an image forming apparatus, a first generation unit controls an image forming unit to form a first measurement image on a first sheet, controls a conveyance unit to convey the first sheet, controls the measurement unit to execute a first scan for measuring the first measurement image based on a measurement condition, adjusts the measurement condition based on a measurement result by the first scan, and controls the measurement unit to execute a second scan for measuring the first measurement image based on the adjusted measurement condition to obtain the first measurement result, and a second generation unit controls the image forming unit to form a second measurement image on a second sheet, controls the conveyance unit to convey the second sheet, and controls the measurement unit to measure the second measurement image to obtain the second measurement result.

11 Claims, 29 Drawing Sheets

(51) Int. Cl.
*H04N 1/03* (2006.01)
*G03G 15/00* (2006.01)

(52) U.S. Cl.
CPC ............ *H04N 1/03* (2013.01); *H04N 1/6005* (2013.01); *H04N 1/6008* (2013.01); *H04N 1/6033* (2013.01); *G03G 2215/00569* (2013.01)

(56) References Cited

U.S. PATENT DOCUMENTS

| | | | |
|---|---|---|---|
| 7,509,065 B2 | 3/2009 | Itagaki | 399/49 |
| 9,335,256 B2 | 5/2016 | Takemura | G01N 21/27 |
| 2004/0042807 A1 | 3/2004 | Nakayama | 399/49 |
| 2006/0198648 A1 | 9/2006 | Itagaki | 399/49 |
| 2014/0226192 A1 | 8/2014 | Takemura | G01N 21/27 |
| 2014/0233049 A1* | 8/2014 | Takemura | H04N 1/0005 358/1.12 |

FOREIGN PATENT DOCUMENTS

| | | |
|---|---|---|
| JP | 2004-086013 | 3/2004 |
| JP | 2006-243276 | 9/2006 |
| JP | 2009-004865 | 1/2009 |
| JP | 2013-134450 | 7/2013 |
| JP | 2014-158116 | 8/2014 |
| JP | 2014-170195 | 9/2014 |

* cited by examiner

FIG. 6

Header:

size : 270176 bytes
CMMType : 'appl'
version : 0x02002001
profileClose : 'prtr'
dataColorSpace : 'CMYK'
interchangeSpace : 'XYZ'
CreationDate : 3. 4. 1996, 19:46:14
CS2Signature : 'acsp' prim. platform : 'APPL'
flags : 0x00000000
deviceManufacture : 'EF1'
deviceModel : 0
deviceAttributes : 0x00000000, 0x00000000
renderingIntent : 2
white XYZ : X=0.9642, Y=1.0000, Z=0.8249
<10 elements, double-click to inspect>

Tag Table :

| Ind | Signet. | elementoffset | size |
|---|---|---|---|
| 0 | 'A2B0' | 252=0x000000FC | 43002 |
| 1 | 'B2A0' | 43256=0x0000A8F8 | 42940 |
| 2 | 'A2B1' | 86196=0x00015084 | 43002 |
| 3 | 'B2A1' | 129200=0x0001F880 | 42940 |
| 4 | 'A2B2' | 172140=0x0002A06C | 43002 |
| 5 | 'B2A2' | 215144=0x00034868 | 42940 |
| 6 | 'gamt' | 258084=0x0003F024 | 11925 |
| 7 | 'desc' | 270012=0x00041EBC | 125 |
| 8 | 'cprt' | 270140=0x00041F3C | 14 |
| 9 | 'wtpt' | 270156=0x00041F4C | 20 |

FIG. 10

| NUMBER | C | M | Y | K |
|---|---|---|---|---|
| 1 | 0 | 0 | 0 | 0 |
| 2 | 50 | 0 | 0 | 0 |
| 3 | 100 | 0 | 0 | 0 |
| 4 | 0 | 50 | 0 | 0 |
| 5 | 50 | 50 | 0 | 0 |
| 6 | 100 | 50 | 0 | 0 |
| 7 | 0 | 100 | 0 | 0 |
| 8 | 50 | 100 | 0 | 0 |
| 9 | 100 | 100 | 0 | 0 |
| 10 | 0 | 0 | 50 | 0 |
| 11 | 50 | 0 | 50 | 0 |
| 12 | 100 | 0 | 50 | 0 |
| 13 | 0 | 0 | 100 | 0 |
| 14 | 50 | 0 | 100 | 0 |
| 15 | 100 | 0 | 100 | 0 |
| 16 | 0 | 50 | 50 | 0 |
| 17 | 50 | 50 | 50 | 0 |
| 18 | 100 | 50 | 50 | 0 |
| 19 | 0 | 50 | 100 | 0 |
| 20 | 50 | 50 | 100 | 0 |
| 21 | 100 | 50 | 100 | 0 |
| 22 | 0 | 100 | 50 | 0 |
| 23 | 50 | 100 | 50 | 0 |
| 24 | 100 | 100 | 50 | 0 |
| 25 | 0 | 100 | 100 | 0 |
| 26 | 50 | 100 | 100 | 0 |
| 27 | 100 | 100 | 100 | 0 |
| 28 | 0 | 0 | 0 | 50 |
| 29 | 50 | 0 | 0 | 50 |
| 30 | 100 | 0 | 0 | 50 |
| 31 | 0 | 50 | 0 | 50 |
| 32 | 50 | 50 | 0 | 50 |
| 33 | 100 | 50 | 0 | 50 |
| 34 | 0 | 100 | 0 | 50 |
| 35 | 50 | 100 | 0 | 50 |
| 36 | 100 | 100 | 0 | 50 |
| 37 | 0 | 0 | 50 | 50 |
| 38 | 50 | 0 | 50 | 50 |
| 39 | 100 | 0 | 50 | 50 |
| 40 | 0 | 0 | 100 | 50 |
| 41 | 50 | 0 | 100 | 50 |
| 42 | 100 | 0 | 100 | 50 |
| 43 | 0 | 50 | 50 | 50 |
| 44 | 50 | 50 | 50 | 50 |
| 45 | 100 | 50 | 50 | 50 |
| 46 | 0 | 50 | 100 | 50 |
| 47 | 50 | 50 | 100 | 50 |
| 48 | 100 | 50 | 100 | 50 |
| 49 | 0 | 100 | 50 | 50 |
| 50 | 50 | 100 | 50 | 50 |
| 51 | 100 | 100 | 50 | 50 |
| 52 | 0 | 100 | 100 | 50 |
| 53 | 50 | 100 | 100 | 50 |
| 54 | 100 | 100 | 100 | 50 |
| 55 | 0 | 0 | 0 | 100 |
| 56 | 50 | 0 | 0 | 100 |
| 57 | 100 | 0 | 0 | 100 |
| 58 | 0 | 50 | 0 | 100 |
| 59 | 50 | 50 | 0 | 100 |
| 60 | 100 | 50 | 0 | 100 |
| 61 | 0 | 100 | 0 | 100 |
| 62 | 50 | 100 | 0 | 100 |
| 63 | 100 | 100 | 0 | 100 |
| 64 | 0 | 0 | 50 | 100 |
| 65 | 50 | 0 | 50 | 100 |
| 66 | 100 | 0 | 50 | 100 |
| 67 | 0 | 0 | 100 | 100 |
| 68 | 50 | 0 | 100 | 100 |
| 69 | 100 | 0 | 100 | 100 |
| 70 | 0 | 50 | 50 | 100 |
| 71 | 50 | 50 | 50 | 100 |
| 72 | 100 | 50 | 50 | 100 |
| 73 | 0 | 50 | 100 | 100 |
| 74 | 50 | 50 | 100 | 100 |
| 75 | 100 | 50 | 100 | 100 |
| 76 | 0 | 100 | 50 | 100 |
| 77 | 50 | 100 | 50 | 100 |
| 78 | 100 | 100 | 50 | 100 |
| 79 | 0 | 100 | 100 | 100 |
| 80 | 50 | 100 | 100 | 100 |
| 81 | 100 | 100 | 100 | 100 |

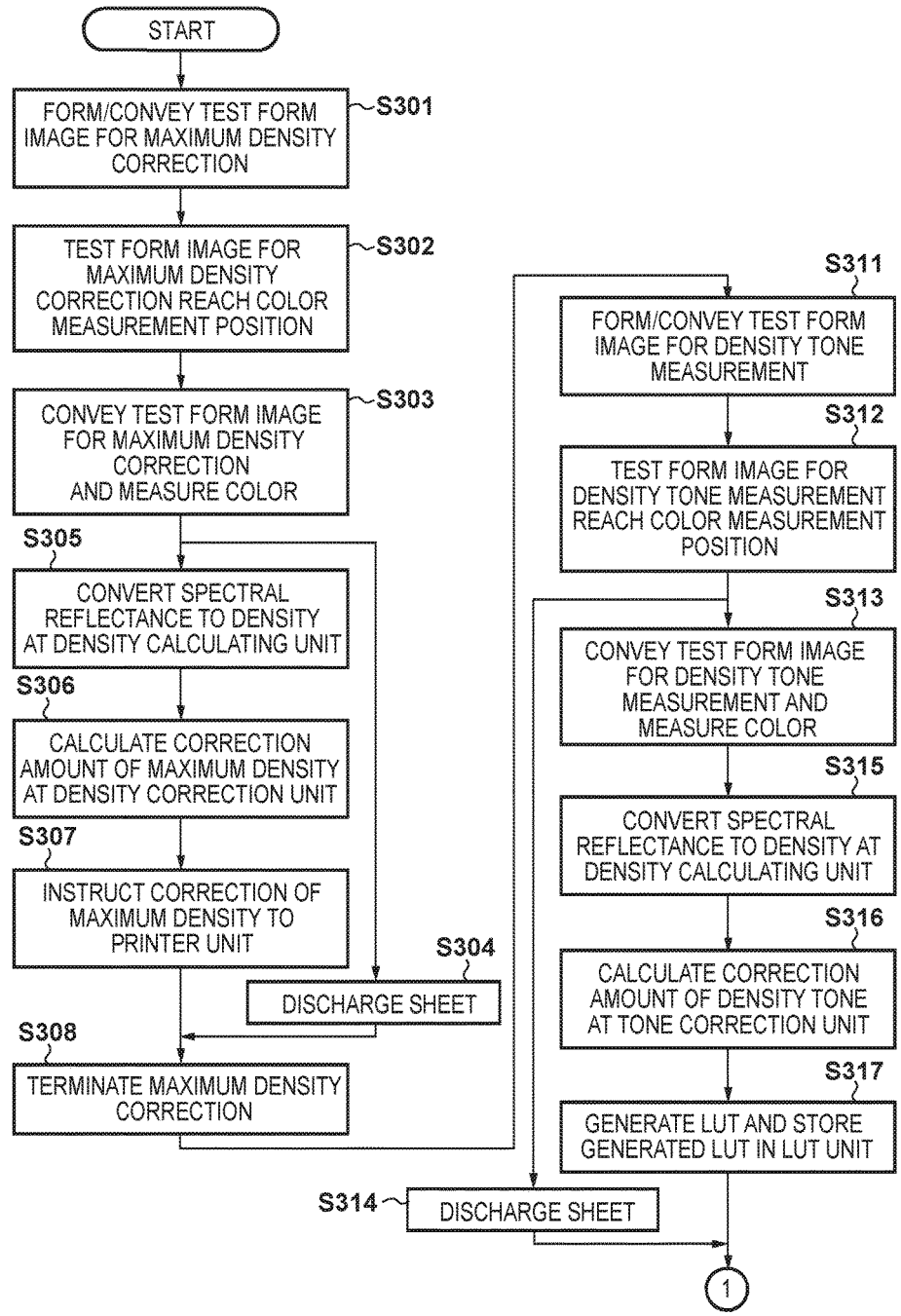
F I G. 14A

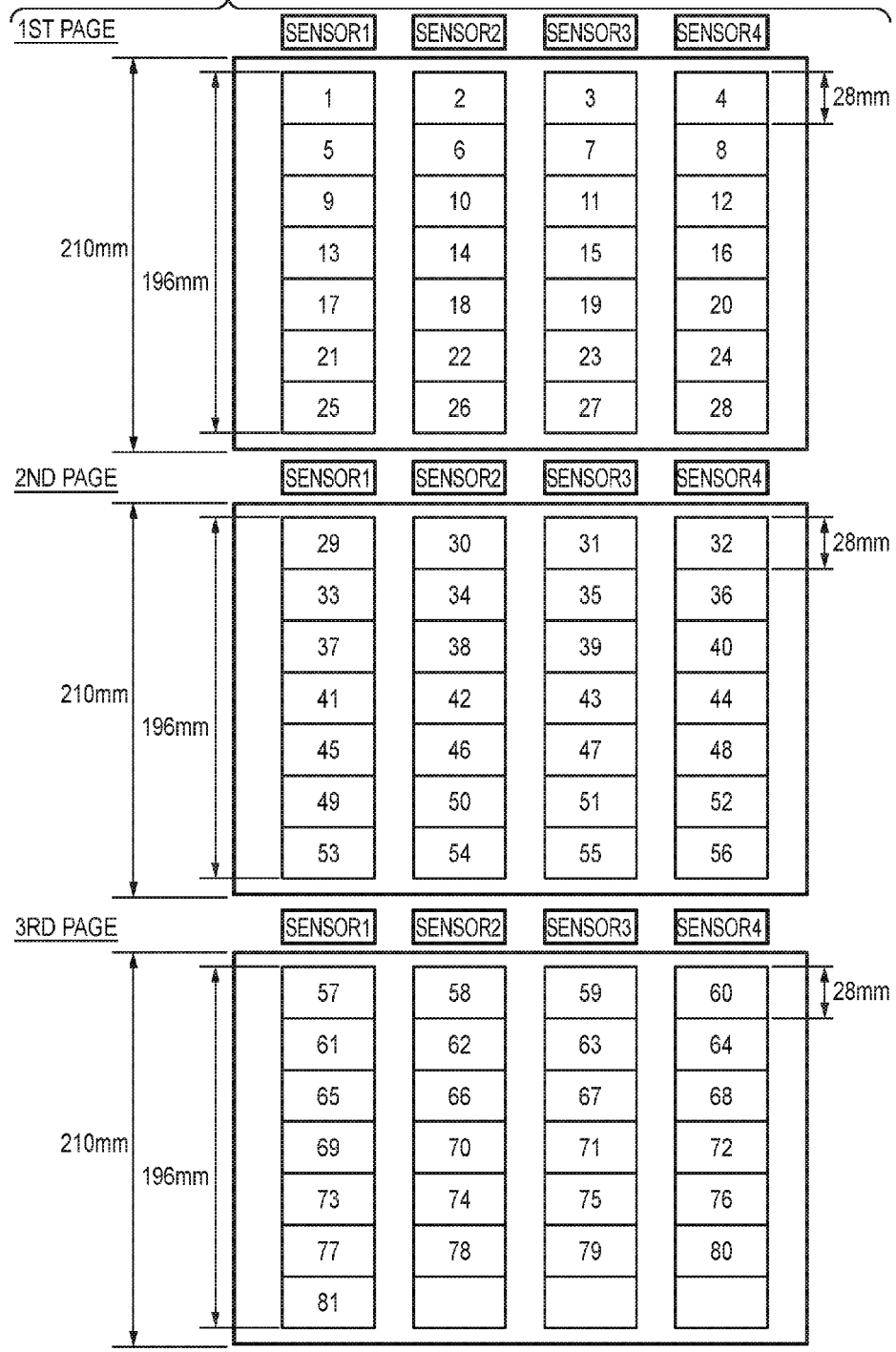
F I G. 16

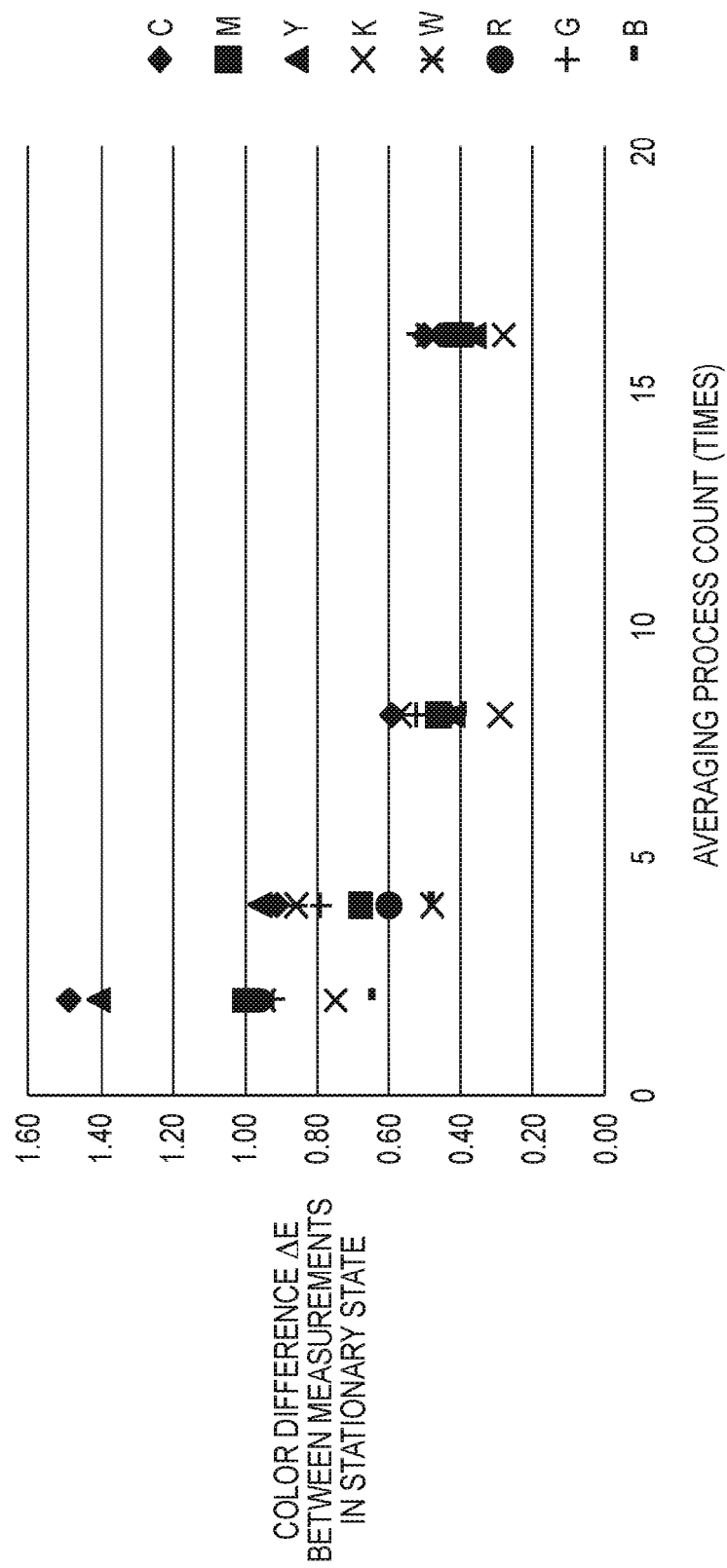

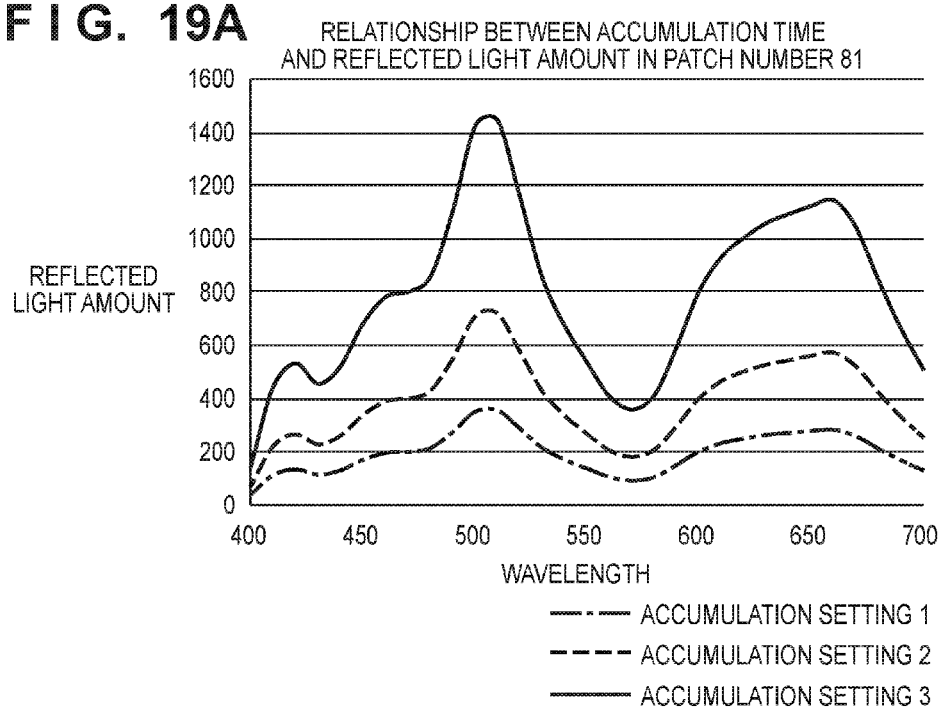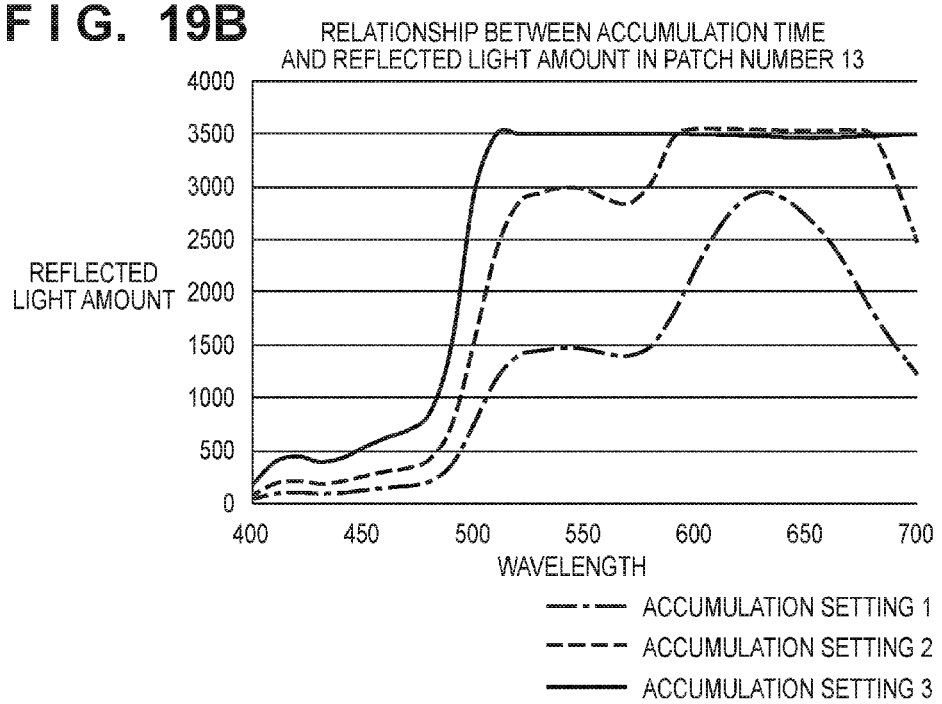

FIG. 22

| TONE | ACCUMULATION SETTING |
|------|----------------------|
| 00H  | 0 |
| 10H  | 0 |
| 20H  | 0 |
| 30H  | 0 |
| 40H  | 0 |
| 50H  | 0 |
| 60H  | 0 |
| 70H  | 0 |
| 80H  | 0 |
| 90H  | 1 |
| A0H  | 1 |
| B0H  | 1 |
| C0H  | 1 |
| D0H  | 1 |
| E0H  | 1 |
| FFH  | 1 |

FIG. 23
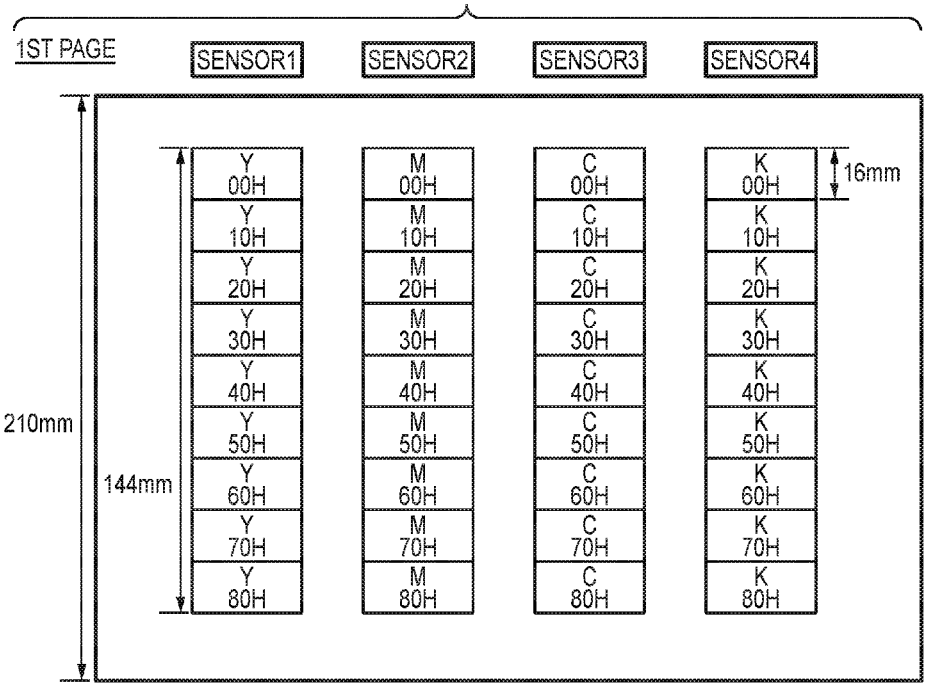
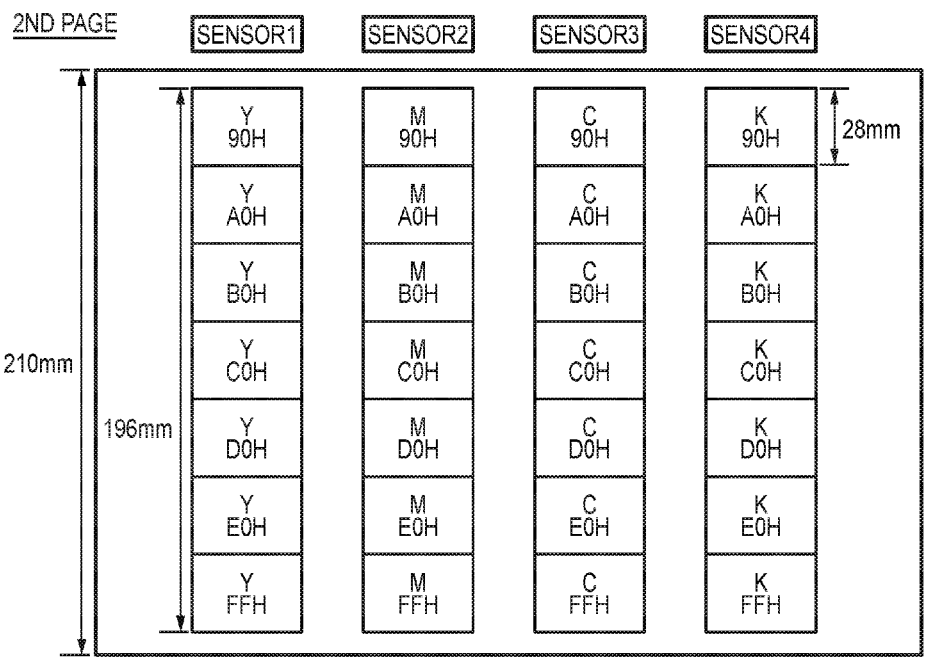

FIG. 24

| TONE | ACCUMULATION SETTING |
|------|----------------------|
| 00H | 1 |
| 04H | 1 |
| 08H | 1 |
| 0CH | 1 |
| 10H | 1 |
| 18H | 1 |
| 20H | 1 |
| 28H | 1 |
| 30H | 1 |
| 40H | 1 |
| 50H | 1 |
| 60H | 1 |
| 70H | 1 |
| 80H | 1 |
| 90H | 1 |
| A0H | 1 |
| B0H | 1 |
| C0H | 1 |
| D0H | 1 |
| E0H | 1 |
| E8H | 1 |
| F0H | 1 |
| F8H | 1 |
| FFH | 1 |

FIG. 25

1ST PAGE

| | SENSOR1 | SENSOR2 | SENSOR3 | SENSOR4 |
|---|---|---|---|---|
| | Y 00H | M 00H | C 00H | K 00H |
| | Y 04H | M 04H | C 04H | K 04H |
| | Y 08H | M 08H | C 08H | K 08H |
| | Y 0CH | M 0CH | C 0CH | K 0CH |
| | Y 10H | M 10H | C 10H | K 10H |
| | Y 60H | M 60H | C 60H | K 60H |
| | Y 18H | M 18H | C 18H | K 18H |
| | Y 20H | M 20H | C 20H | K 20H |
| | Y 28H | M 28H | C 28H | K 28H |
| | Y 30H | M 30H | C 30H | K 30H |
| | Y 40H | M 40H | C 40H | K 40H |
| | Y 50H | M 50H | C 50H | K 50H |

210mm / 192mm / 16mm

2ND PAGE

| | SENSOR1 | SENSOR2 | SENSOR3 | SENSOR4 |
|---|---|---|---|---|
| | Y 70H | M 70H | C 70H | K 70H |
| | Y 80H | M 80H | C 80H | K 80H |
| | Y 90H | M 90H | C 90H | K 90H |
| | Y A0H | M A0H | C A0H | K A0H |
| | Y B0H | M B0H | C B0H | K B0H |
| | Y C0H | M C0H | C C0H | K C0H |
| | Y D0H | M D0H | C D0H | K D0H |
| | Y E0H | M E0H | C E0H | K E0H |
| | Y E8H | M E8H | C E8H | K E8H |
| | Y F0H | M F0H | C F0H | K F0H |
| | Y F8H | M F8H | C F8H | K F8H |
| | Y FFH | M FFH | C FFH | K FFH |

| CONTROL TYPE | COLOR (YMC) ACCUMULATION SETTING | BLACK (K) ACCUMULATION SETTING | MULTI-ORDER COLOR ACCUMULATION SETTING |
|---|---|---|---|
| MAXIMUM DENSITY CORRECTION CONTROL | FIXED ACCUMULATION SETTING 2 | FIXED ACCUMULATION SETTING 3 | - |
| TONE DENSITY CORRECTION CONTROL | FIXED ACCUMULATION SETTING 1 | FIXED ACCUMULATION SETTING 1 | - |
| MULTI-ORDER COLOR CAL | - | - | CHANGEABLE DETERMINE IN PRE-SCAN |

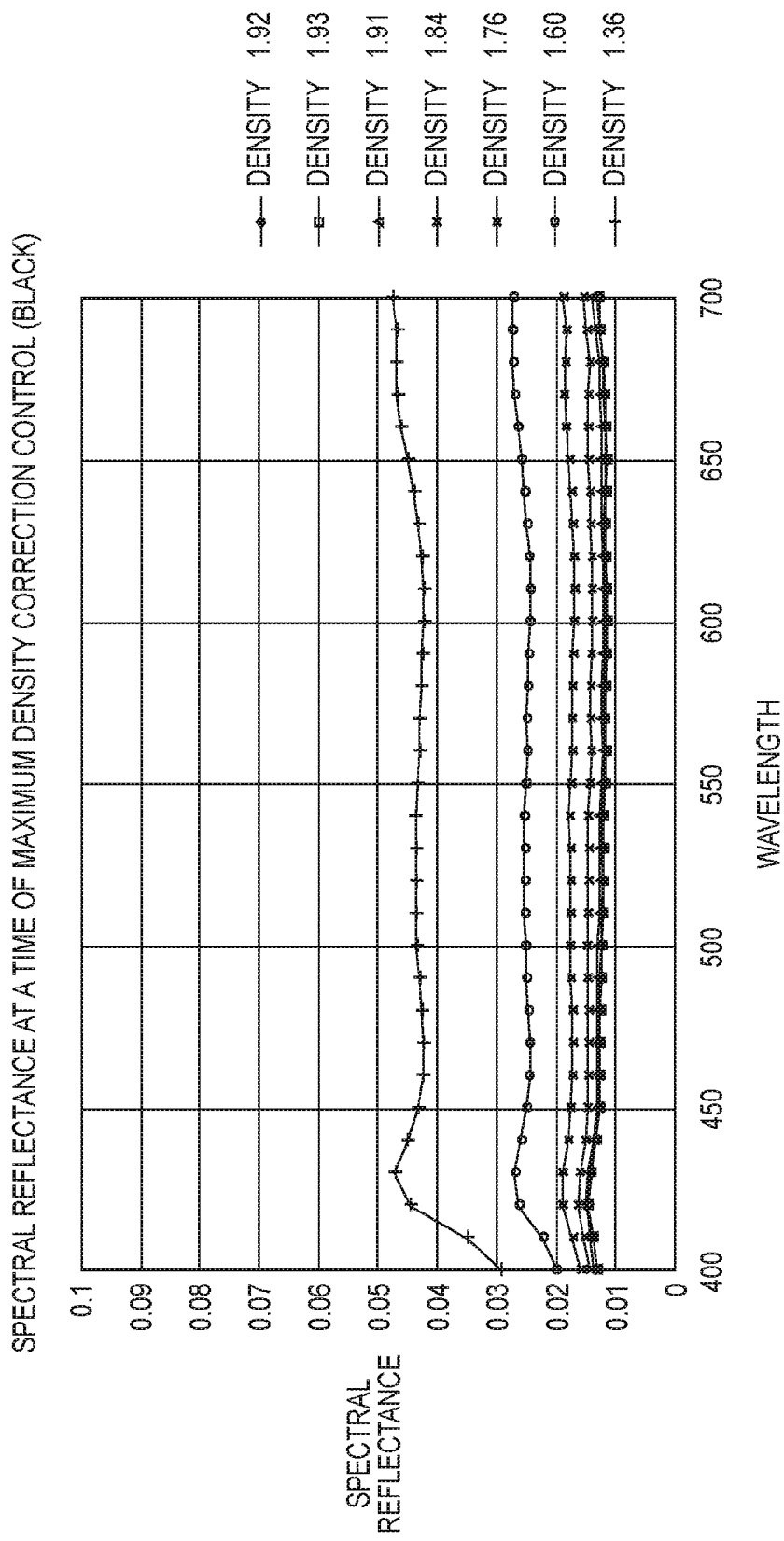

IMAGE FORMING APPARATUS WITH COLOR CALIBRATION BY MEASUREMENT IMAGE

BACKGROUND OF THE INVENTION

Field of the Invention

The present invention relates to an image forming apparatus.

Description of the Related Art

In recent years, one quality of an image (hereinafter referred to as image quality) of an image forming apparatus (hereinafter referred to as printer) that is spreading is color reproducibility (including color stability). For color reproducibility, differences in color not only within the same model, but also across different models, and from an image display apparatus or an image forming apparatus of a different format is a problem. Because color mapping between such devices is performed, there is software and colorimeters for generating a multi-dimensional LUT called an ICC (International Color Consortium) profile, for example.

For example, a pro user generates an ICC profile of a printer and an ICC profile of an offset printing device, and constructs a color management environment as in FIG. 7. As illustrated in FIG. 7, the content of the ICC profile for printing and the ICC profile for the printer is that each is calibrated in association with a color space, on which the device does not depend, based on a color measurement of a patch using a colorimeter. A CIE L*a*b* color space (CIE is an international illumination commission; abbreviation of Commission Internationale d'Eclairage), for example, is an example of a color space that is not device dependent. By this, it is possible to cause colors printed on printing devices and colors printed by printers to match. Also, a color management module (CMM) is able to generate print data by performing color conversion using such profiles.

However, for color management environments as above, it takes effort to construct an environment, and the like, and so there has not been sufficient spread to general users. For this reason, it is desirable to speed up measurement, simplify generation of profiles, and automate setting work.

For example, in US2014/0226192, in color management using a color sensor, a method in which it is possible to reduce a number of sheets while suppressing an increase in the size of an image for measurement (a test chart) is disclosed.

In recent years, there is a strong desire for speed increases and elimination of user stress, and there is a rising need to improve a sheet conveying speed of an image forming apparatus and to shorten the time for calibration. Furthermore, demand is emerging that as few printing mediums as possible be required for calibration. At the same time, there is a strengthening desire for improving precision of calibration.

SUMMARY OF THE INVENTION

The present invention, in view of the foregoing problems, enables simultaneous satisfaction of desires of the user in relation to calibration such as high precision detection, acceleration, time shortening, reduction of the number of printing mediums, and the like.

According to one aspect of the present invention, there is provided an image forming apparatus comprising: an image forming unit configured to form a measurement image on a sheet; a conveyance unit configured to convey the sheet on which the measurement image is formed; a measurement unit configured to measure the measurement image formed on the sheet; a first generation unit configured to generate color data based on a first measurement result of the measurement unit; and a second generation unit configured to generate density data based on a second measurement result of the measurement unit, wherein the first generation unit controls the image forming unit to form a first measurement image on a first sheet, controls the conveyance unit to convey the first sheet, controls the measurement unit to execute a first scan for measuring the first measurement image based on a measurement condition, adjusts the measurement condition based on a measurement result obtained by the first scan, and controls the measurement unit to execute a second scan for measuring the first measurement image based on the adjusted measurement condition to obtain the first measurement result, and wherein the second generation unit controls the image forming unit to form a second measurement image on a second sheet, controls the conveyance unit to convey the second sheet, and controls the measurement unit to measure the second measurement image to obtain the second measurement result.

By the present invention, it becomes possible to simultaneously achieve a high precision color detection, handling of acceleration, shortening of calibration time, and reduction of the number of printing mediums needed for the calibration.

Further features of the present invention will become apparent from the following description of exemplary embodiments (with reference to the attached drawings).

BRIEF DESCRIPTION OF THE DRAWINGS

FIG. 6 is an overview explanatory view of an ICC profile according to the present invention.

FIG. 10 is a view that illustrates automatic multi-order color correction patch signal values according to the present invention.

FIGS. 14A and 14B are overall flowcharts for an automatic multi-order color correction according to the present invention.

FIG. 16 is a view that illustrates an example of a patch arrangement upon a chromaticity detection according to a first embodiment.

FIG. 18 is a view that illustrates averaging process count and a stationary measurement value color difference ΔE according to the first embodiment.

FIGS. 19A and 19B are views that illustrate a relationship between accumulation time and a quantity of incident light of a sensor according to the present invention.

FIG. 22 is a view that illustrates an example of accumulation settings at a time of tonal density detection according to the first embodiment.

FIG. 23 is a view that illustrates an example of a patch arrangement upon a tonal density detection according to the first embodiment.

FIG. 24 is a view that illustrates an example of accumulation settings at a time of tonal density detection according to a second embodiment.

FIG. 25 is a view that illustrates an example of a patch arrangement upon a tonal density detection according to the second embodiment.

FIG. 27 is a view that illustrates an example of accumulation settings upon a maximum density correction control of color and black according to a third embodiment.

FIG. 28 is a view that illustrates an example of a spectral reflectance obtained upon a maximum density correction of black according to a third embodiment.

DESCRIPTION OF THE EMBODIMENTS

<First Embodiment>

[Image Forming Apparatus]

In the present embodiment, a laser beam printer of an electrophotographic method is used for explaining a solution to the foregoing problem. The electrophotographic method is used in the following explanation, but the same problem exists for an ink-jet printer or a dye sublimation printer regarding a characteristic point regarding control and the problem can be solved using the method mentioned below. Also, a characteristic configuration according to present application invention can be configured as an independent color measurement apparatus included in an image forming apparatus.

Figure 1:
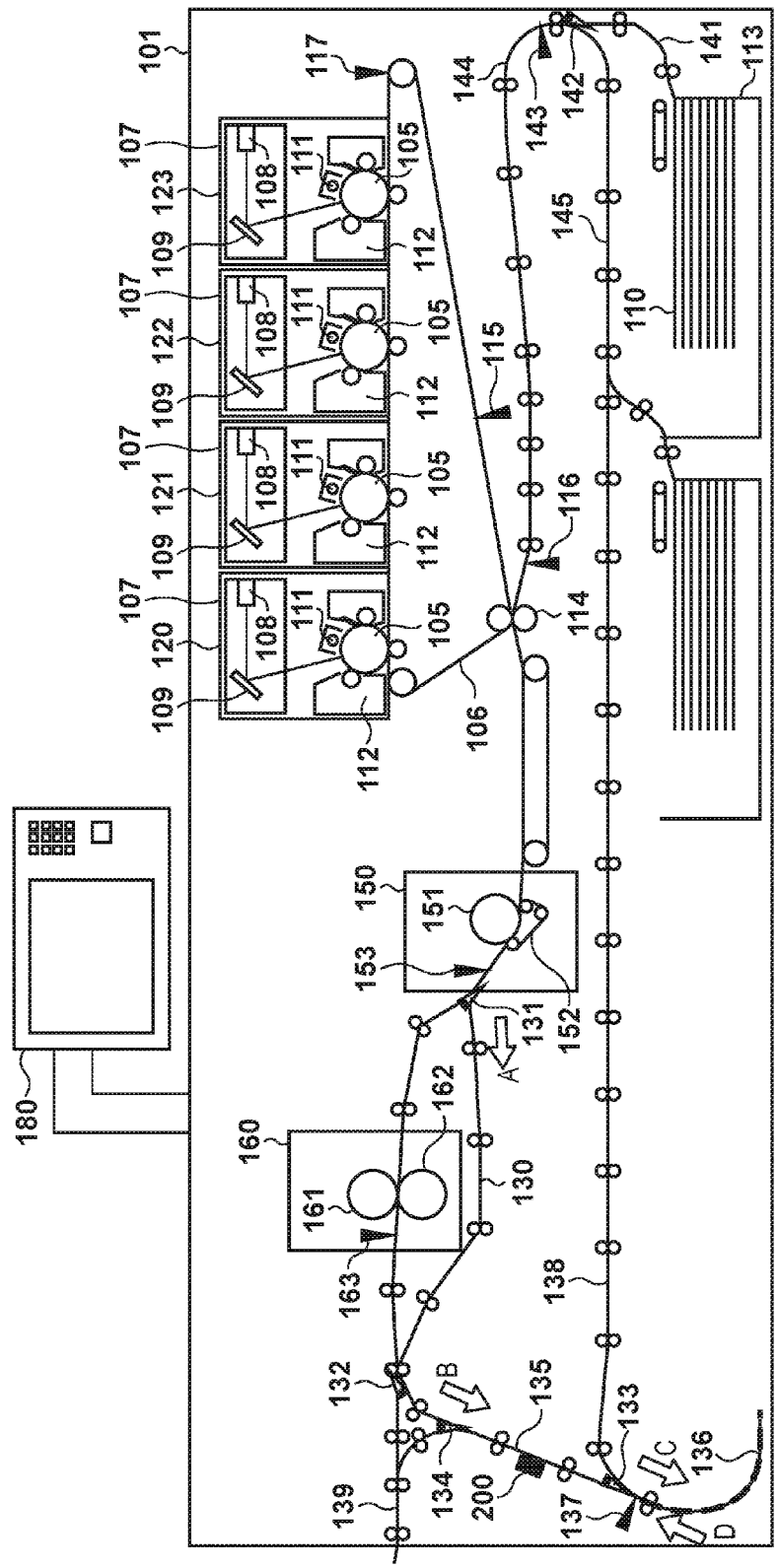
FIG. 1 is an overview configuration diagram of an image forming apparatus according to the present invention.
Figure 3:
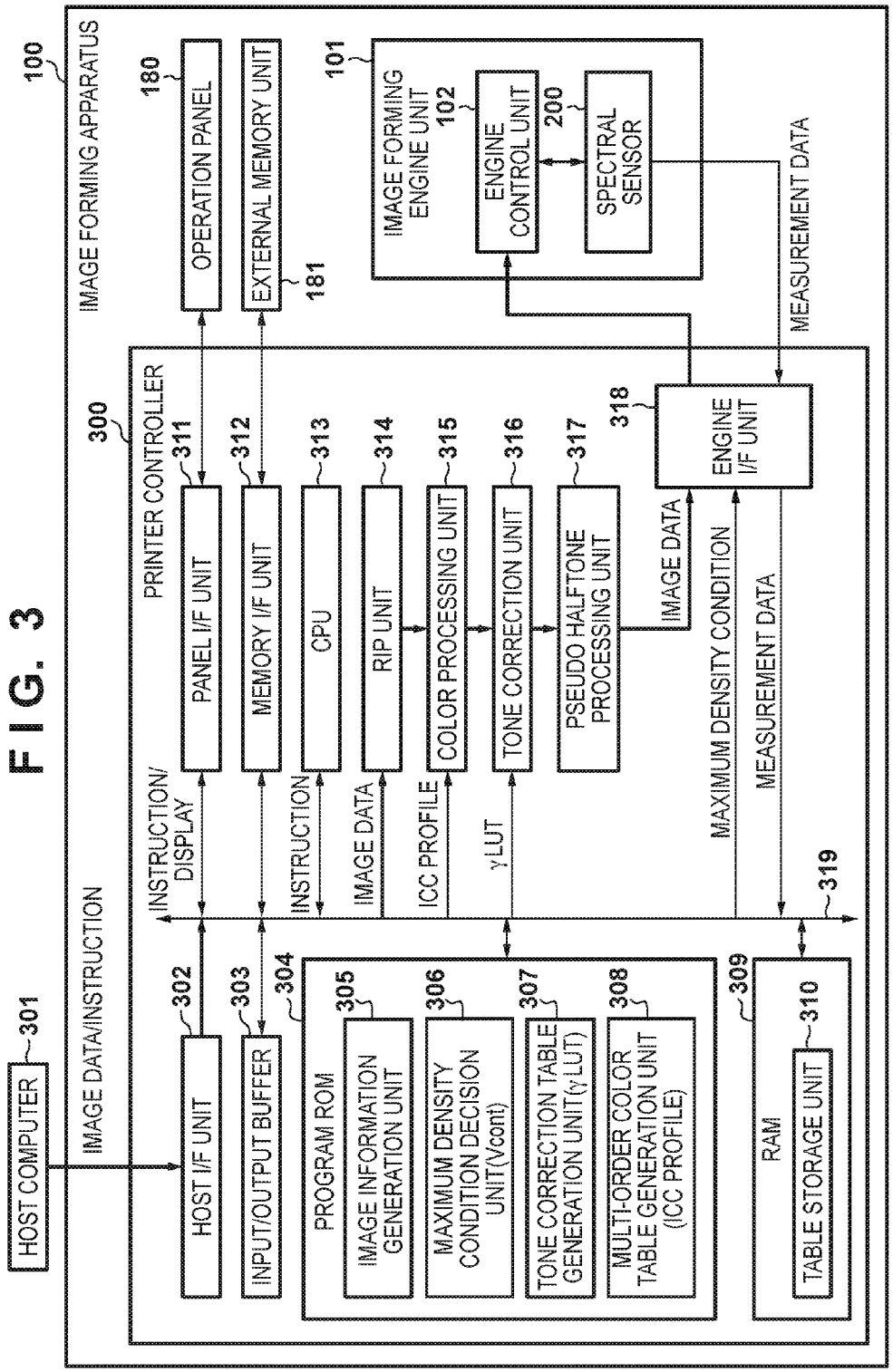
FIG. 3 is an overview configuration diagram of an image processing unit according to the present invention.

A structure and an operation of the image forming apparatus of the present invention is explained. FIG. 1 is a cross-section view that illustrates a structure of an image forming apparatus 100 according to the embodiment. The image forming apparatus 100 comprises an image forming engine unit 101. Each mechanism for configuring an engine unit, an engine control unit 102 for performing a control of each print process (for example sheet feeding processing) by each mechanism, and a control board housing unit (not shown) for storing a printer controller 300 are built into the image forming engine unit 101. Detail of the printer controller 300 is illustrated in FIG. 3.

An optical process mechanism, a fixing process mechanism, a sheet feeding process mechanism for a recording material 110, and a conveyance process mechanism for the recording material 110 are arranged as mechanisms for configuring the image forming engine unit 101.

The optical process mechanism forms electrostatic latent images on photosensitive drums 105 by scanning laser beams, visualizes the electrostatic latent images, performs multiple transfer of the visualized images to an intermediate transfer body 106, and further performs a transfer of the multiple transferred color image to the recording material 110. The optical process mechanism has a laser driver (not shown) for driving on or off the laser beams emitted from semiconductor lasers 108 in accordance with image data supplied from the printer controller 300 in laser scanner units 107. The laser beams emitted from the semiconductor lasers 108 are swung in a scanning direction by rotating polygonal mirrors (not shown). Here, the laser beams swung in the main scanning direction are guided to the photosensitive drums 105 via reflecting mirrors 109 and exposed in the main scanning direction on the photosensitive drums 105.

Meanwhile, electrostatic latent images formed on the photosensitive drums 105 by charging by chargers 111 and scanning exposure by the laser beams are visualized into toner images by toners which are color materials that are supplied by developers 112. Then, the toner images visualized on the photosensitive drums 105 are transferred (first order transfer) onto the intermediate transfer body 106 where voltages with reverse characteristics to the toner images are applied. Upon the color image forming, the optical process mechanism sequentially forms each color from a Y (yellow) station 120, an M (magenta) station 121, a C (cyan) station 122, and a K (black) station 123 onto the intermediate transfer body 106. As a result, a full color visible image is formed on the intermediate transfer body 106.

The visible image formed on the intermediate transfer body 106 is transferred (second order transfer) onto the recording material 110 that is fed in synchronization in a sub scanning direction by the sheet feeding process mechanism. More specifically, by applying a bias of a reverse characteristic of the toner to a transfer roller 114 simultaneously to the recording material 110 (a sheet) fed from a cassette 113 being conveyed and the recording material 110 being pressed by the transfer roller 114 on the intermediate transfer body 106, the visible image is transferred onto the recording material 110. The recording material 110 is a printing medium such as a sheet of paper. Note, the photosensitive drums 105 and the developers 112 can be attached/removed.

Also, an image formation start position detection sensor 115, a feed timing sensor 116, and a density sensor 117 are arranged around the intermediate transfer body 106. The image formation start position detection sensor 115 determines a print start position upon performing the image formation. The feed timing sensor 116 measures the timing of feeding of the recording material 110. The density sensor 117 measures a density of a patch (image for measurement) upon density control. When density control is performed, density measuring of each patch is performed by the density sensor 117.

The fixing process mechanism causes a toner image transferred on the recording material 110 to be fixed. The fixing process mechanism has a first fixing device 150 and a second fixing device 160 for causing a toner image transferred on the recording material 110 to be fixed by a thermal pressing. The first fixing device 150 includes a fixing roller 151 for applying heat to the recording material 110, a pressure belt 152 for causing the recording material 110 to be pressed by the fixing roller 151, and a post-fixing sensor 153 for detecting a completion of fixing. Each roller is a hollow roller and has a heater (not shown) internally, and is configured to be rotationally driven and to convey the recording material 110 at the same time. The second fixing device 160 is positioned on a downstream side of a conveyance path of the recording material 110 from the first fixing device 150, and is placed for a purpose for adding a gloss to the toner image on the recording material 110 fixed by the first fixing device 150 and for securing a fixing characteristic. The configuration of the second fixing device 160 is similar to the first fixing device 150, and there is a fixing roller 161, a pressure roller 162, and a post-fixing sensor 163.

Depending on the type of the recording material 110, there are materials for which it is not necessary to pass through the second fixing device 160. For such recording materials 110, a conveyance path 130 is included in order to discharge the recording material 110 without passing through the second fixing device 160 for the purpose of an energy consumption reduction. It is possible to guide the recording material 110 to the conveyance path 130 by a conveyance path switching flapper 131.

The recording material 110 is guided to a conveyance path 135 by a conveyance path switching flapper 132 and after a position detection of the recording material 110 is performed by an inversion sensor 137, a leading edge of the recording material 110 is swapped by a switchback operation of an inversion unit 136.

Furthermore, a spectral sensor 200 for detecting a patch image on the recording material 110 is placed after the second fixing device 160. In a case where an execution of a calibration mode is instructed from an operation panel 180, density adjusting, tone adjustment, and multi-order color adjustment is executed in the engine control unit 102 based on a detection result by the spectral sensor 200.

The recording material 110 used upon an image formation is stacked on the cassette 113. Also, as another use, a configuration may be such that an output article once outputted by the image forming apparatus 100, or an output article outputted by another image forming apparatus are stacked on the cassette 113. In this case, measurement target object set on the cassette 113 is guided to the inversion unit 136 and conveyed to measurement position where the spectral sensor 200 is placed. After a measurement by the spectral sensor 200 is performed, the measurement target object is conveyed from the conveyance path 135 to a conveyance path 139, and discharged from the device.

(Operation Panel)

Figure 2:
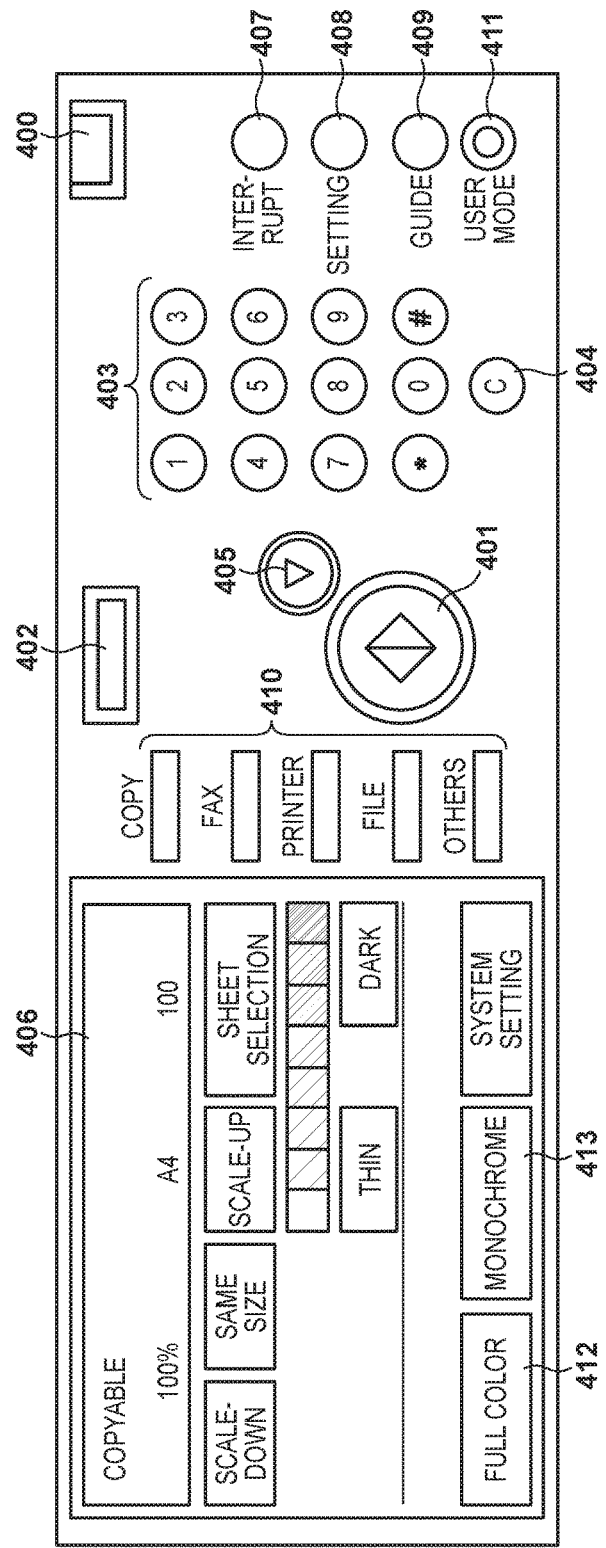
FIG. 2 is an overview configuration diagram of an operation panel according to the present invention.

FIG. 2 is a plan view of the operation panel unit. A soft switch 400 is a switch for turning a power supply of a main body of the image forming apparatus 100 ON/OFF. A copy start key 401 is a key for a copy start instruction. A reset key 402 is a key for returning to a standard mode. The standard mode is a "full color-one side" setting for image formation. A numeric keypad 403 is keys for inputting numeric values such as for setting number of sheets. A clear key 404 is a key for clearing a numeric value. A stop key 405 is a key for stopping a copy during consecutive copying. A liquid crystal display unit 406 displays a setting of each kind of a mode or a state of a printer and may function as a touch panel. An interrupt key 407 is a key for interrupting and performing an emergency copy during consecutive copying or during usage of a fax or a printer.

A setting key 408 is a key for managing a number of copies for each individual or for each department. A guidance key 409 is a key pressed when a guidance function is used. A function key 410 is a key used when a function of the image forming apparatus is changed. A user mode button 411 is a key for a user entering a user mode for performing management or settings, such as, for example, a sensor sensitivity adjustment, a calibration mode, a sheet registration, and a change of time set for entering an energy saving mode. A full color image forming mode key 412 is a key pressed when a mode for performing an image formation with a full color is selected. Also, a monochrome image forming mode key 413 is a key pressed when a mode for performing an image formation in monochrome (black and white) is selected.

(Image Processing Unit)

FIG. 3 is a view that illustrates an example configuration of a print system according to the embodiment. A host computer 301 and the image forming apparatus 100 are connected to be capable of communicating by a communication line such as USB 2.0 High-Speed, 1000Base-T/100Base-TX/10Base-T (IEEE802.3 compliant), or the like, for example.

In the image forming apparatus 100, the printer controller 300 controls operation of the entirety of the image forming apparatus 100. The printer controller 300 has a host I/F unit 302, an input/output buffer 303, a CPU 313, a program ROM 304, a RAM 309, a panel I/F unit 311, a memory I/F unit 312, a RIP unit 314, a color processing unit 315, a tone correction unit 316, a pseudo halftone processing unit 317, and an engine I/F unit 318. Each configuration element is connected to be capable of communicating via a system bus 319.

The host I/F unit 302 controls input and output to and from the host computer 301. The input/output buffer 303 performs transmission and reception of a control code from the host I/F unit 302 or data from each communication unit. The CPU 313 controls an operation of entire of the printer controller 300. The program ROM 304 integrates control programs or control data of the CPU 313. The program ROM 304 stores control programs according to an image information generation unit 305. The image information generation unit 305 functions by the control programs being read out and executed by the CPU 313, and generates various image objects according to setting data received from the host computer 301. The RAM 309 is used for various control code, calculations required for data interpretation or printing, or a work memory for processing print data. The panel I/F unit 311 is an interface to the operation panel 180, and receives an instruction from a user via the operation panel 180, or provides display data. The memory I/F unit 312 is an interface to an external memory unit 181 and performs data transmission and reception with the external memory unit 181.

The RIP (Raster Image Processor) unit 314 expands an image object into a bitmap image. The color processing unit 315 performs color conversion processing of a multi-order color. The tone correction unit 316 corresponds to a correction unit for correcting image data based on a γ LUT for each color, and executing monochrome tone correction. The pseudo halftone processing unit 317 executes pseudo halftone processing such as that of a dither matrix or an error diffusion method. The engine I/F unit 318 transfers a converted image to the image forming engine unit 101. The image forming engine unit 101 performs an image formation using the transferred image.

In FIG. 3, a basic flow of the image processing of the printer controller 300 upon an image formation is illustrated with bold solid-lines.

Also, the printer controller 300 controls not only the image formation but also various control calculations. Control programs for this purpose are stored in the program ROM 304. More specifically, the program ROM 304 has control programs according to a maximum density condition decision unit 306, a tone correction table generation unit 307, and a multi-order color table generation unit 308. Each control program functions by being read out and executed by the CPU 313. The maximum density condition decision unit 306 performs a maximum density adjustment and determines Vcont (called image development contrast). The tone correction table generation unit 307 generates a γ LUT (Look Up Table). The multi-order color table generation unit 308 generates an ICC profile as a multi-dimensional LUT in order to correct a fluctuation of a multi-order color. Note that a detailed description relating to various control calculation in the printer controller 300 is described later using FIG. 5.

Also, the image information generation unit 305, the maximum density condition decision unit 306, the tone correction table generation unit 307, and the multi-order color table generation unit 308 are stored as modules in the program ROM 304. The ICC profile, the γ LUT, the Vcont information, which are used upon an image formation, are managed and updated by execution of these modules, and it becomes possible to output a desired color by causing the color processing unit 315 or the tone correction unit 316 to change (reflect) the table.

(Spectral Sensor)

Figure 4:
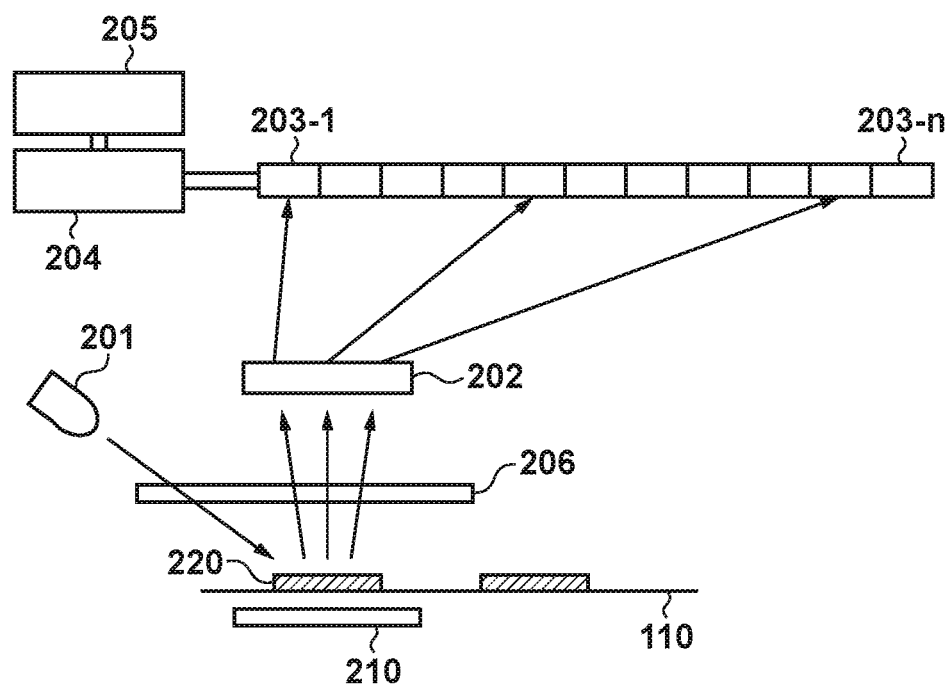
FIG. 4 is an overview configuration diagram of a spectral sensor according to the present invention.

A structure and a measurement operation of a color sensor of spectral type according to the embodiment is explained using FIG. 4. Note that limitation is not made to this if it is a color sensor capable of changing accumulation time which is a feature of the present embodiment.

FIG. 4 is a view that illustrates an example configuration of the spectral sensor 200 according to the embodiment. The spectral sensor 200 includes a white LED 201, a diffraction grating 202, a line sensor 203, a calculation unit 204, a memory 205, and a white reference plate 210. The white LED 201 functions as an irradiation unit for irradiating a light on a measurement target (here a toner patch 220) on the recording material 110. The diffraction grating 202 disperses by wavelength the reflected light reflecting from the toner patch 220. The line sensor 203 is configured by n pixels (203-1 through 203-n), and each pixel detects light dispersed by wavelength by the diffraction grating 202. The line sensor 203 is a photoreception unit and is capable of receiving light with wavelengths from 380 [nm] to 720 [nm] by light receiving elements of n pixels. The calculation unit 204 performs various calculations from a light intensity value of each pixel detected by the line sensor 203. The calculation unit 204 has for example a density calculation unit (not shown) for calculating a density from a light intensity value, and a Lab calculation unit (not shown) for calculating a Lab value. The memory 205 stores various data. The calculation unit 204 calculates a spectral reflectance R (λ) of the toner patch 220 from a result P (λ) obtained by the line sensor 203 receiving a reflected light from the toner patch 220 and a result W (λ) obtained by the line sensor 203 receiving a reflected light from the white reference plate 210. Light reception data W (λ) corresponding to the white reference plate 210 is obtained by the white reference plate 210 being irradiated by the white LED 201 and the line sensor 203 detecting a reflected light from the white reference plate 210. The light reception data W (λ) corresponding to the white reference plate 210 is stored in the memory 205.

Also, in a configuration of the spectral sensor 200, a configuration may be taken in which a lens 206 for focusing light irradiated from the white LED 201 on the toner patch 220 on the recording material 110 and for focusing a light reflecting from the toner patch 220 on the diffraction grating 202 is built-in. Here, for example a CMOS sensor is used for the line sensor 203.

[Operation Explanation]

In the present embodiment, the image forming apparatus 100 can operate in a normal image forming mode and a calibration mode. Explanation is given for operation of each of the modes.

(Normal Image Forming Mode)

The normal image forming mode is a mode in which processing for color conversion into a signal value depending on the image forming apparatus 100 is performed on an image signal value inputted from the host computer 301, the operation panel 180 or the like, and, by this signal value being inputted into the image forming engine unit 101, image formation is performed. When CMYK signal values depending on the image forming apparatus 100 are input into the image forming engine unit 101, an image based on those signal values is generated in the image forming apparatus 100, and the image is outputted.

(Color Conversion Processing)

Figure 5:
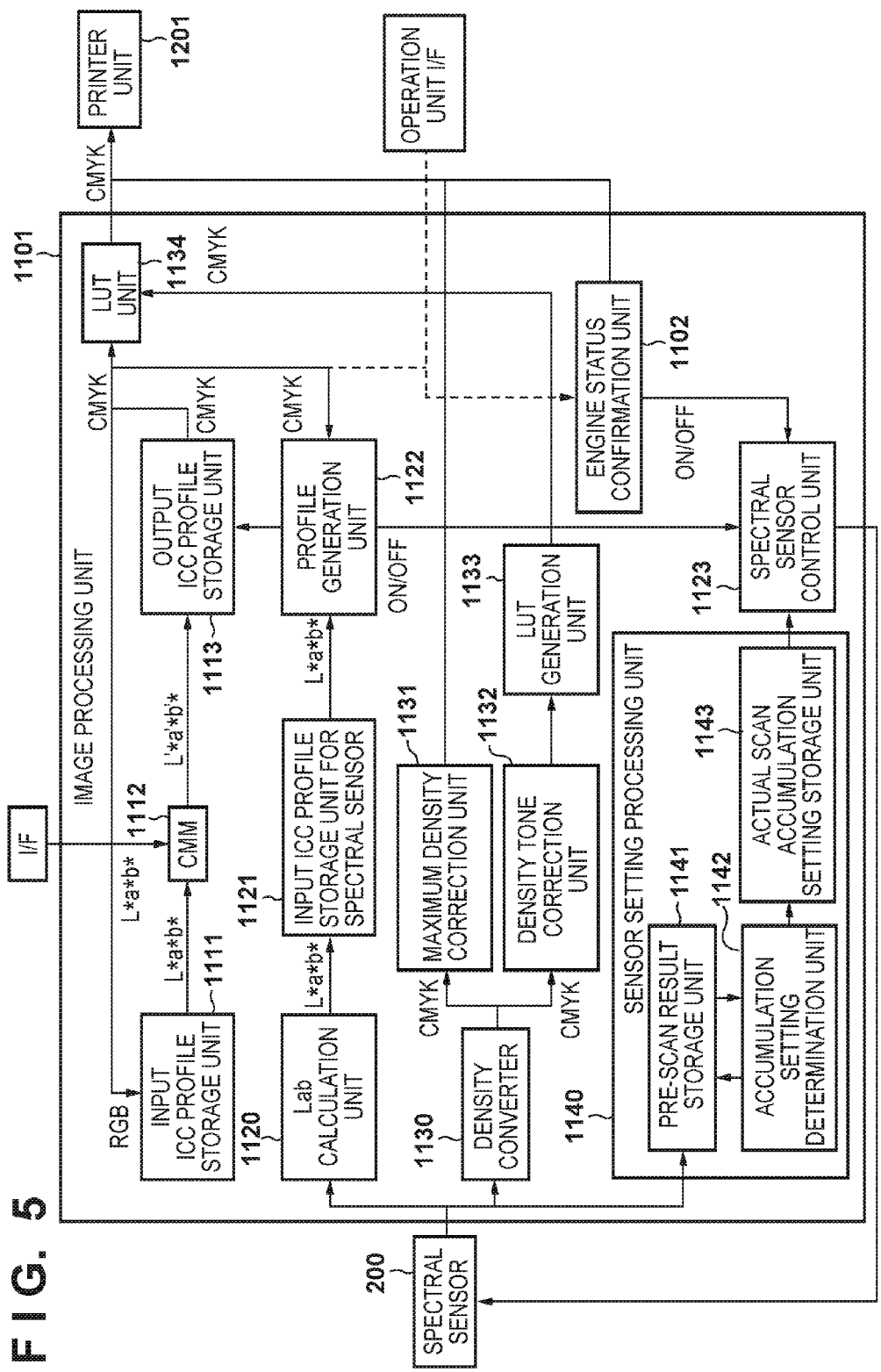
FIG. 5 is a block diagram of an image processing unit according to the present invention.

Using FIG. 3 and FIG. 5, explanation is given for the color conversion processing. In a color conversion in normal color output, an inputted image signal, for which standard printing CMYK signal values such as RGB signal values, Japan-Color, or the like inputted from the host computer 301 is envisioned, is sent to an input ICC profile storage unit 1111. In the input ICC profile storage unit 1111, an RGB→L*a*b* conversion, or a CMYK→L*a*b* conversion is performed in accordance with the image signal inputted via the external I/F. An input ICC profile is configured by a one-dimensional LUT for controlling an input signal, a multi-order color LUT referred to as a direct mapping, and a one-dimensional LUT for controlling generated conversion data. Using these tables, a conversion from a color space dependent on the device to L*a*b* data which is independent of the device is performed.

The image signal converted into the L*a*b* chromaticity coordinates is inputted to a CMM 1112. Then, a GAMUT conversion, a color conversion, and a black character determination are performed. The GAMUT conversion is processing for mapping a mismatch between a read color space of the external I/F as an input device, and an output color reproduction range of the image forming apparatus 100 as an output device. As the color conversion here, processing for adjusting a mismatch between a light source type at a time of input and a light source type when viewing an output article (called a color temperature setting mismatch), for example, applies. By this, the L*a*b* data is converted into L*'a*'b*' data, and inputted into the output ICC profile storage unit 1113. The output ICC profile generation method is explained later, but a color conversion is performed on the inputted L*'a*'b*' data in accordance with the ICC profile, a conversion into a CMYK signal value which depends on the output device is performed, and the result is outputted. Here, the ICC profile corresponds to a conversion condition for converting image data in order to correct the tint of an image formed by a printer unit 1201. The output ICC profile storage unit 1113 functions as a conversion unit for converting image data based on the ICC profile.

By the CMYK signal value being input into the image forming engine unit 101, and an image formation being performed based on the signal value, an output according to the normal image forming mode is performed.

Figure 7:
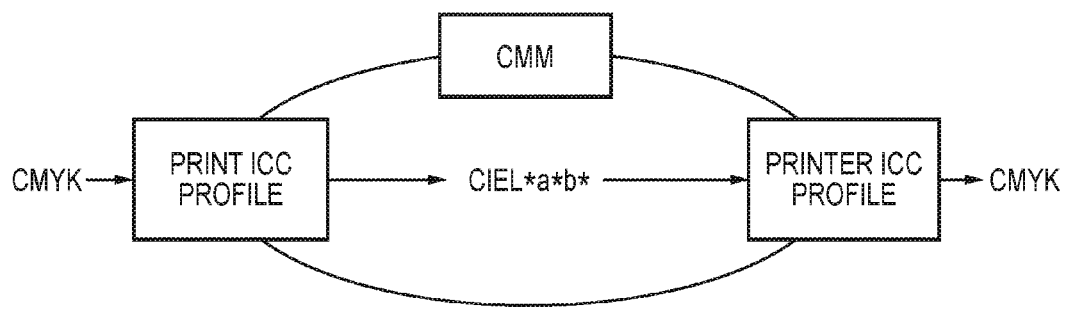
FIG. 7 is a schematic view of a color management environment.

Note that the CMM 1112 is a module that controls color management, and performs a color conversion using an input profile stored in the input ICC profile storage unit 1111, and an output profile stored in the output ICC profile storage unit 1113, as in FIG. 7.

(Calibration Mode)

Next, explanation is given for the calibration mode. The image forming apparatus 100 calculates the spectral reflectance R ($\lambda$) of a monochrome image for measurement from a result of measurement of the monochrome image for measurement by the spectral sensor 200, converts this spectral reflectance R ($\lambda$) into a density value, and based on the converted density value, performs maximum density/tone correction to correct maximum density and tonality. Also, the image forming apparatus 100 calculates the spectral reflectance R ($\lambda$) of a multi-order color image for measurement from a result of measurement of the multi-order color image for measurement by the spectral sensor 200, and generates a profile (multi-dimensional LUT) for suppressing multi-order color tint fluctuation using this spectral reflectance R ($\lambda$). Processing for generating the profile is referred to as a multi-order color CAL. Note that here an ICC profile is used as a profile. However, limitation is not made to an ICC profile. For example, a CRD (Color Rendering Dictionary) employed from level 2 of Postscript which is advocated by Adobe, a color separation table in Photoshop, a CMYK simulation in ColorWise of the company EFI which maintains ink plate information, or the like may be used.

Using FIG. 5, a maximum density/tone correction and a multi-order color CAL are explained.

(Density Control/Tone Control)

In the image forming apparatus 100, a maximum density/tone correction is executed so that a desired density image is obtained.

An image processing unit 1101 illustrated in FIG. 5 is a module stored in the program ROM 304 in the printer controller 300 of FIG. 3, and is a portion that performs input data conversion processing and calculation processing.

First, explanation is given for maximum density control. When an execution of maximum density control is instructed, an engine status confirmation unit 1102 outputs measurement image data for forming a test chart (an image for measurement) to the printer unit 1201, the CPU 313 sends a measurement instruction to a spectral sensor control unit 1123. At this time, a test chart is formed using image forming conditions (a charge condition, an exposure condition, and a developing condition) determined in advance, or determined at the time of the previous correction. The test chart output here is measured by the spectral sensor 200. The test chart includes a yellow image for measurement, a magenta image for measurement, a cyan image for measurement, and a black image for measurement. The spectral reflectance R ($\lambda$) of the test chart calculated by the calculation unit 204 is sent to a density converter 1130 as the spectral reflectance data. The density converter 1130 converts the spectral reflectance R ($\lambda$) of the test chart into density, and sends the conversion result to a maximum density correction unit 1131 as CMYK density data. The maximum density correction unit 1131 calculates correction amounts of the image forming conditions (the charge condition, the exposure condition, and the developing condition), and corrects the image forming conditions so that the desired maximum density is achieved. The image forming conditions calculated in this way are stored in the RAM 309.

Figure 8A:
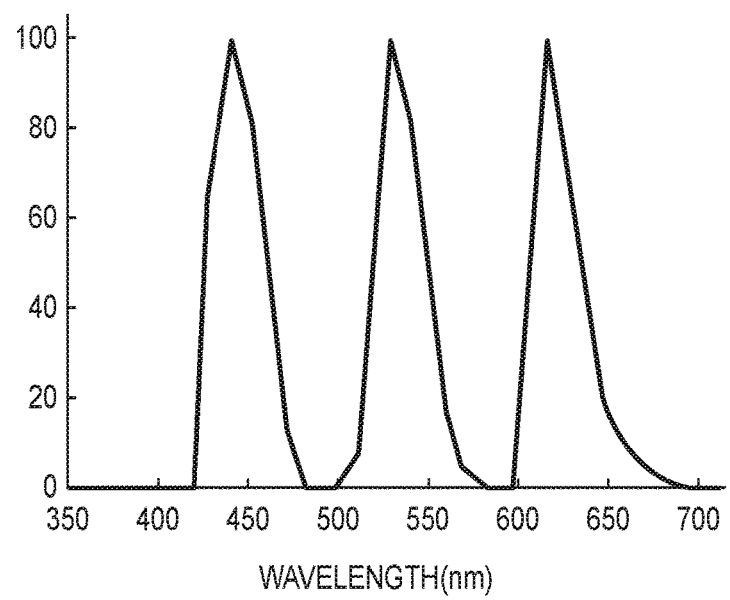
FIGS. 8A and 8B are views for explaining a sensitivity characteristic of a filter used in density calculation processing according to the present invention.

The density converter 1130 converts the spectral reflectance of the yellow image for measurement into a density using a status A filter illustrated in FIG. 8A. Similarly, in the case where densities of images for measurement for magenta and cyan are obtained, the density converter 1130 converts into the densities from the spectral reflectances of the images for measurement using the status A filter illustrated in FIG. 8A. Meanwhile, for a case where the density of the image for measurement for black is obtained, the density converter 1130 converts into a density from the spectral reflectance of the image for measurement using a visibility spectral characteristic (called Visual) illustrated in FIG. 8B.

Next, explanation is given for tone control. After the maximum density control is executed, measurement image data for forming tone patterns in which maximum density patches are included using the image forming conditions determined by the maximum density correction unit 1131 is transferred to the printer unit 1201. The tone patterns are, for example, images for measurement in which for one color there are 16 tones, and where 64 images for measurement are formed. The tones of the tone patterns of each color are indicated in base 16 by 00H, 10H, 20H, 30H, 40H, 50H, 60H, 70H, 80H, 90H, A0H, B0H, C0H, D0H, E0H, FFH. A measurement instruction is sent to the spectral sensor control unit 1123. While printing material on which tone patterns are fixed passes the measurement position of the spectral sensor 200, the spectral sensor 200 measures the tone patterns. The spectral reflectance R ($\lambda$) of the tone patterns calculated by the calculation unit 204 is sent to the density converter 1130 as the spectral reflectance data. The density converter 1130 performs the previously described density calculation, and sends the density data of the tone patterns of each color to a density tone correction unit 1132. The density tone correction unit 1132 calculates image signal values for forming target density images so that desired tone characteristics are obtained. An LUT generation unit 1133 generates a $\gamma$ LUT for each color based on image signal values determined by the density tone correction unit 1132, and sends the generated $\gamma$ LUT to an LUT unit 1134. Here, the $\gamma$ LUT corresponds to correction conditions for correcting image data to correct the tone characteristics of an image.

(Multi-Order Color CAL)

Explanation is given of a multi-order color CAL for forming a multi-order color image for measurement on a printing material by the printer unit 1201, and generating an ICC profile based on a spectral reflectance of the multi-order color image for measurement measured by the spectral sensor 200.

The calculation unit 204, using a color matching function, converts a spectral reflectance of a multi-order color image for measurement into L*a*b* data (brightness and chromaticity data).

For the L*a*b* data, a relationship with an image signal value for forming the multi-order color image for measurement is obtained, and the ICC profile is generated.

(L*a*b* Calculation)

Figure 9:
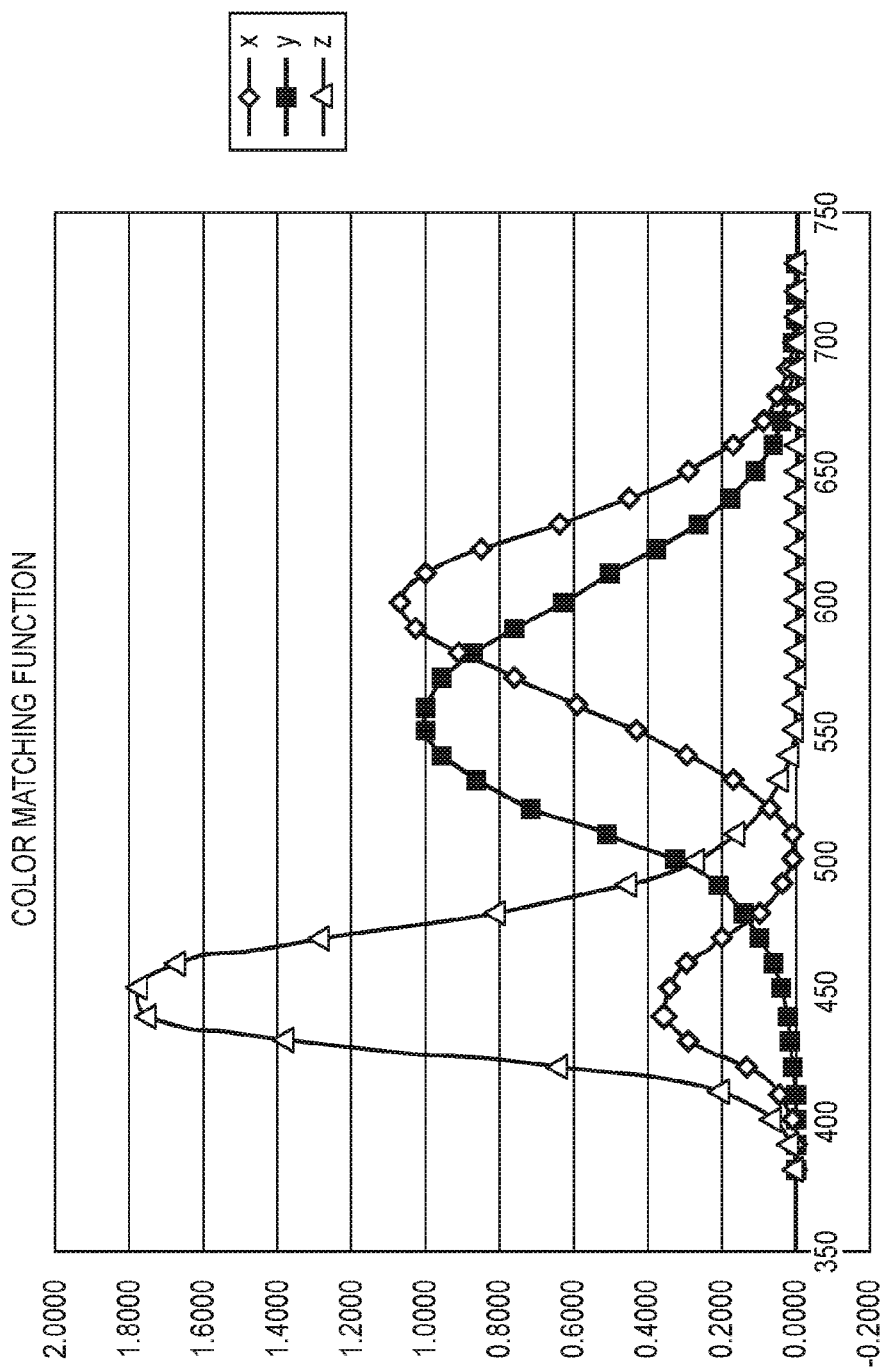
FIG. 9 is a view that illustrates color matching functions used in chromaticity calculation processing according to the present invention.

Below is a method for calculating L*a*b* data from spectral reflectance. Note that the method described here is stipulated in ISO 13655.

a. Obtain the spectral reflectance R ($\lambda$) of the multi-order color image for measurement (380 nm-780 nm).

b. Prepare color matching functions x($\lambda$), y($\lambda$), and z($\lambda$), and a standard light spectral distribution SD50($\lambda$). Note that the color matching functions (FIG. 9) are stipulated in JIS Z8701. Also, SD50(λ) is stipulated in JIS Z8720, and is called an auxiliary standard illuminant D50.

c. A wavelength is obtained using a prepared function.

$$R(\lambda) \times SD50(\lambda) \times x(\lambda)$$

$$R(\lambda) \times SD50(\lambda) \times y(\lambda)$$

$$R(\lambda) \times SD50(\lambda) \times z(\lambda)$$

d. Integration of each wavelength is performed.

$$\Sigma\{R(\lambda) \times SD50(\lambda) \times x(\lambda)\}$$

$$\Sigma\{R(\lambda) \times SD50(\lambda) \times y(\lambda)\}$$

$$\Sigma\{R(\lambda) \times SD50(\lambda) \times z(\lambda)\}$$

e. The product of the color matching function y(λ) and the standard light spectral distribution SD50(λ) is integrated in relation to each wavelength.

$$\Sigma\{SD50(\lambda) \times y(\lambda)\}$$

f. XYZ is calculated.

$$X = 100 \times \frac{\Sigma\{SD50(\lambda) \times y(\lambda)\}}{\Sigma\{R(\lambda) \times SD50(\lambda) \times x(\lambda)\}}$$

$$Y = 100 \times \frac{\Sigma\{SD50(\lambda) \times y(\lambda)\}}{\Sigma\{R(\lambda) \times SD50(\lambda) \times y(\lambda)\}}$$

$$Z = 100 \times \frac{\Sigma\{SD50(\lambda) \times y(\lambda)\}}{\Sigma\{R(\lambda) \times SD50(\lambda) \times z(\lambda)\}}$$

g. L*a*b* is calculated. If Y/Yn>0.0088656, it can be obtained by the following calculating expressions. Here, Xn, Yn and Zn indicate standard light tristimulus values.

$$L^* = 116 \times \left(\frac{Y}{Yn}\right)^{\frac{1}{3}} - 16$$

$$a^* = 500 \times \left\{\left(\frac{X}{Xn}\right)^{\frac{1}{3}} - \left(\frac{Y}{Yn}\right)^{\frac{1}{3}}\right\}$$

$$b^* = 200 \times \left\{\left(\frac{Y}{Yn}\right)^{\frac{1}{3}} - \left(\frac{Z}{Zn}\right)^{\frac{1}{3}}\right\}$$

$$\left(\frac{X}{Xn}\right)^{\frac{1}{3}} = 7.78 \times \left(\frac{X}{Xn}\right)^{\frac{1}{3}} + \frac{16}{116}$$

$$\left(\frac{Y}{Yn}\right)^{\frac{1}{3}} = 7.78 \times \left(\frac{Y}{Yn}\right)^{\frac{1}{3}} + \frac{16}{116}$$

$$\left(\frac{Z}{Zn}\right)^{\frac{1}{3}} = 7.78 \times \left(\frac{Z}{Zn}\right)^{\frac{1}{3}} + \frac{16}{116}$$

Note that x(λ), y(λ), z (λ) can also be recited as $x(\bar{\lambda})$, $y(\bar{\lambda})$, $z(\bar{\lambda})$.

(Multi-Order Color Table Generation Method and Correction Method)

Next, an ICC profile generation method that is performed by the multi-order color table generation unit 308 will be discussed. ICC profile generation employs a configuration of Japanese Patent Laid-Open No. 2009-004865 in which it is possible to align a multi-order color in a small number of patches. Note that limitation is not made to this, and another method may be employed.

The multi-order color table generation unit 308 stores CMYK image signal values for forming a multi-order color image for measurement of FIG. 10, and a profile generation chart corresponding thereto, and receives a result of measurement from the spectral sensor 200. Note that details of the profile generation chart corresponding to the CMYK image signal values will be explained later. Also, the multi-order color table generation unit 308 stores in advance a standard profile, and measurement data of 928 patches which is an ISO 12642 test form for when the standard profile was generated. Accordingly, the multi-order color table generation unit 308 calculates differences between this data and chromaticities of the spectral sensor 200, and generates the multi-order color table of the ICC profile configuration by estimating the difference of other grid points.

The number of patches necessary is 81 patches as indicated by the patch numbers of FIG. 10. In FIG. 10, the CMYK image signal values of each patch are represented in parts per hundred. These 81 patches are included in the 928 patches at the time of the standard profile generation.

Figure 11:
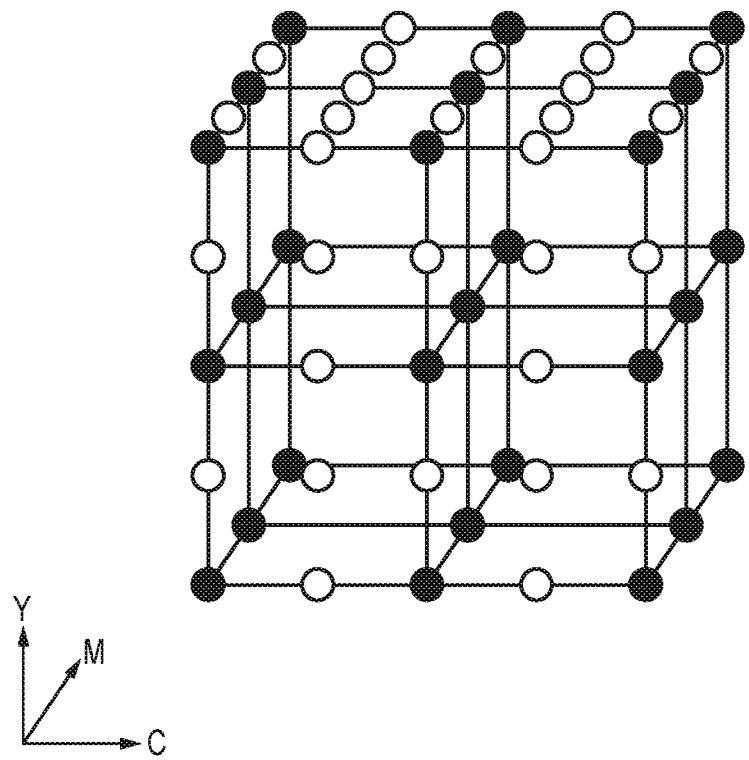
FIG. 11 is a view that illustrates a relationship between measurement values and a CMY space required upon an ICC profile generation according to the present invention.

FIG. 11 plots some of these in the CMY space where K=0, and the white circles illustrates some of the 928 patches at the time of the standard profile generation. Also, the black circles express patches that exist in both the foregoing 928 patches and the previously described 81 patches. The black circles illustrated in FIG. 11 respectively correspond to patches 1-27 in the patches of FIG. 10.

Figure 12:
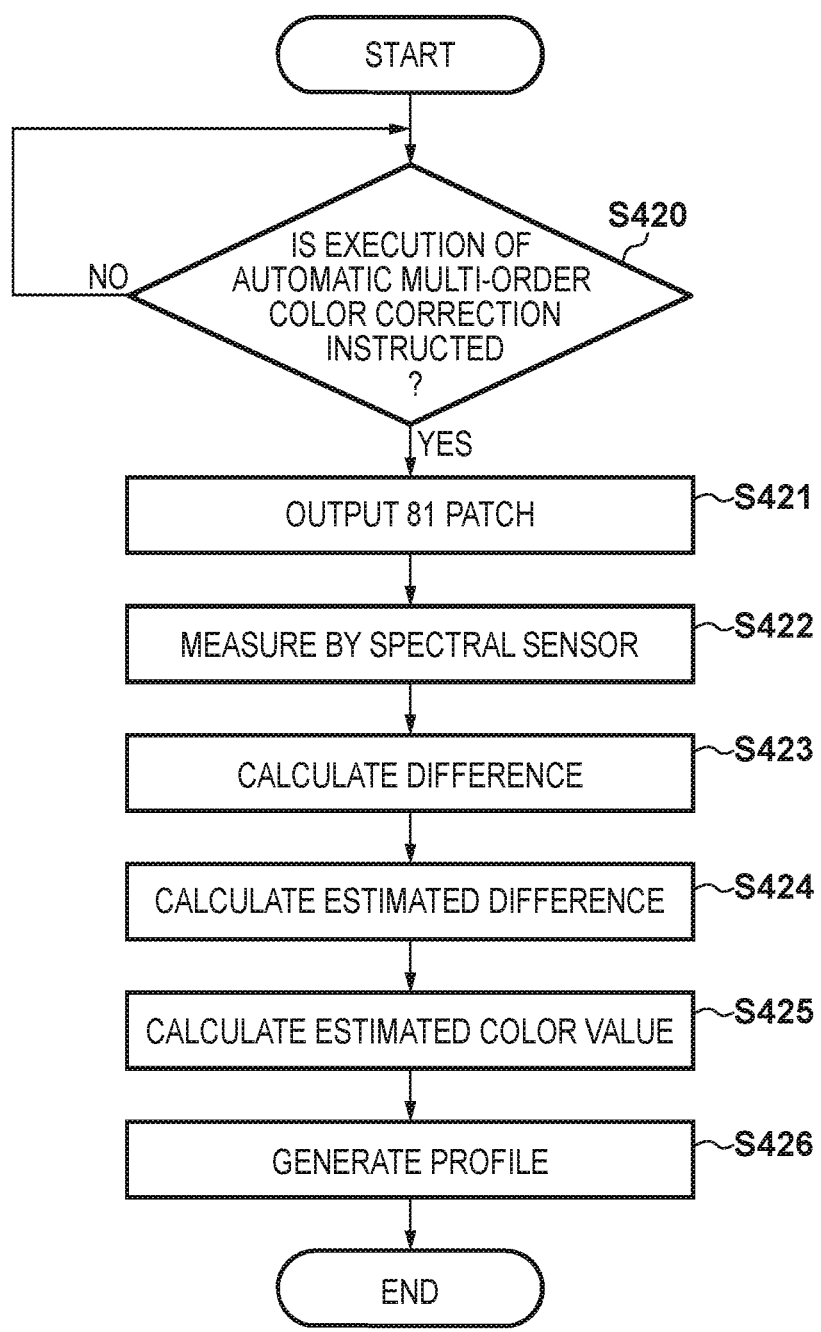
FIG. 12 is a flowchart for generating a profile upon an automatic multi-order color correction according to the present invention.

FIG. 12 is a flowchart that illustrates a profile generation procedure in the present invention.

In step S420, the CPU 313 determines whether or not the execution of an automatic multi-order color correction is instructed via the operation panel 180. If the execution of the automatic multi-order color correction is instructed (YES in step S420), the processing proceeds to step S421.

In step S421, the engine control unit 102 forms the multi-order color images for measurement of the 81 patches corresponding to the CMYK image signal values of FIG. 10 on the recording material 110.

In step S422, the spectral sensor control unit 1123 measures by the spectral sensor 200 each of the multi-order color images for measurement.

In step S423, a profile generation unit 1122 calculates the differences between the measured color values at the time of generation of the standard profile consisting of the 928 patches stored in advance and the measurement values measured in step S422.

In step S424, the profile generation unit 1122 performs an estimation of differences for patches other than the 81 measured this time in the 928 patches.

Here, explanation is given of an example of a method of estimating differences. Firstly, color information (C1, M1, Y1, and K1) of patches for which the estimation of the differences performed this time is retrieved from out of the 928 patches of the time of the standard profile generation. Note that the color information of the 928 patches is stored in advance. Next, the maximum K2, where K2<K1, from out of the 81 patches measured this time is determined, and also the minimum K3, where K1<K3, is determined.

Figure 13:
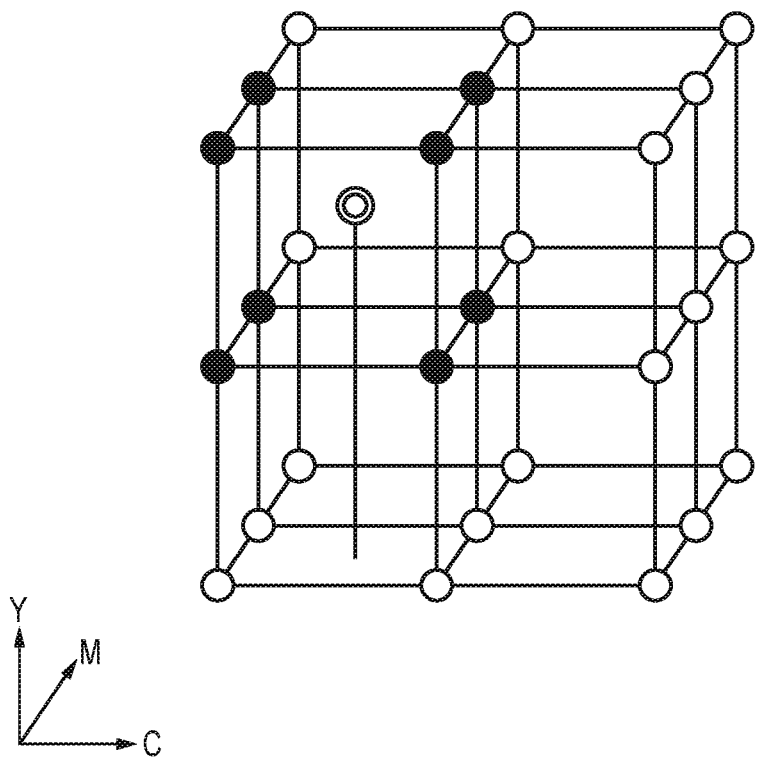
FIG. 13 is a view that explains an automatic multi-order color correction difference estimation method according to the present invention.

Next, from out of the patches for which black is K2 in the 81 patches measured this time, eight points surrounding the color information S1 in a cubic shape are determined. FIG. 13 illustrates the determined points. In the CMY space where K=K2, color information (C1, M1, Y1, and K2) is plotted in a double circle, and the eight points in the 81 patches that surround it in a cubic shape are plotted in black circles. Other patches are plotted in the white circles. Next, by a three-dimensional linear interpolation from the differences corresponding to the color information of the eight points, the difference D1 for the color information (C1, M1, Y1, and K2) is calculated.

Similarly, the difference D2 is calculated for K=K3. Then, from the differences D1 and D2, the difference D3 where K=K1 is calculated by a linear interpolation. The difference D3 is the estimated value of the difference for the color information (C1, M1, Y1, and K1). In the process of determining K2 and K3, if a K2 exists such that K1=K2, it is possible to obtain the difference D3 by calculation of the difference D1. The foregoing estimation method is performed sequentially for all points of the measured color values of the time of standard profile generation. Note that in place of the eight points, the estimation may be performed using a tetrahedral interpolation that uses four points, or the like.

In step S426, the profile generation unit 1122 generates an output ICC profile based on a relationship between the CMYK signal and L*a*b* data of the 81 patches caused to be outputted, and the CMYK signal and L*a*b* data of the 928 patches of the ISO 12642 test form. The profile generation unit 1122 functions as a generation unit for generating an ICC profile. The CPU 313 swaps the newly generated output ICC profile and the output ICC profile stored in the color processing unit 315.

The ISO 12642 test form covers a color gamut that a general copy machine can output. It is possible to generate a color conversion table from the relationship between the image signal values of the multi-order color images for measurement and the L*a*b* data. That is, a CMYK→Lab conversion table is generated. Based on this conversion table, an inverse conversion table is generated.

The ICC profile has a structure as in FIG. 6, and is configured to include a header, tags, and data thereof. For the tags, in addition to the color conversion table, tags that describe whether a particular color represented by Lab values defined within the profile or a white point (Wtpt) is inside or outside a range that can be reproduced in a hard copy are described.

(Simple Calibration Mode and Full Calibration Mode)

A simple calibration mode and a full calibration mode are explained using FIG. 5, FIG. 14A-FIG. 14B, and FIG. 15A-FIG. 15C. In the case where the execution of the full calibration mode is instructed, the CPU 313 causes the image forming apparatus 100 to execute maximum density/tone correction control and multi-order color CAL consecutively. Meanwhile, in the case where the execution of the simple calibration mode is instructed, the CPU 313 causes the image forming apparatus 100 to execute the maximum density/tone correction control only.

Figure 15A:
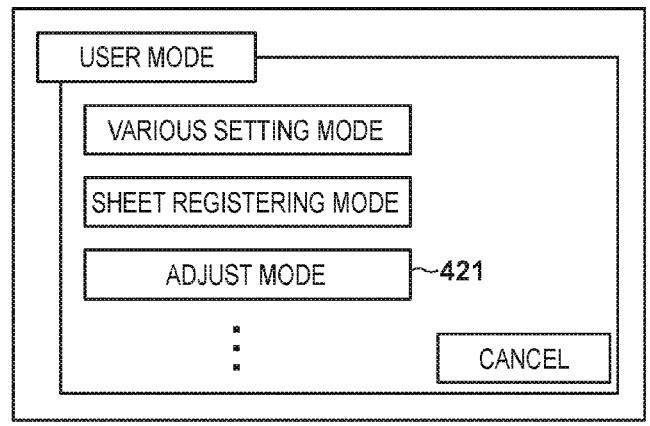
FIGS. 15A, 15B and 15C are views that illustrate an example of an operation panel display unit.
Figure 15B:
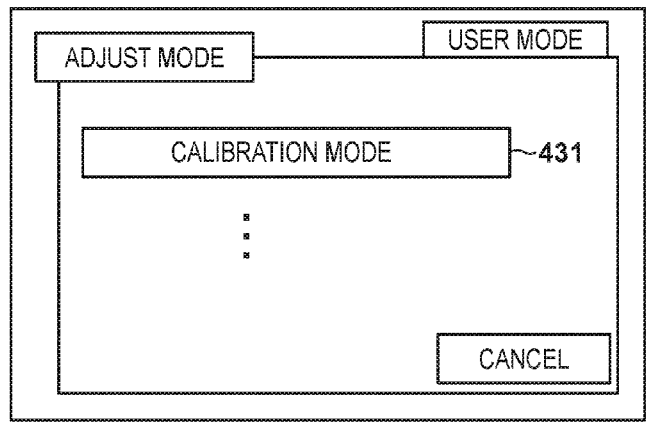
Figure 15C:
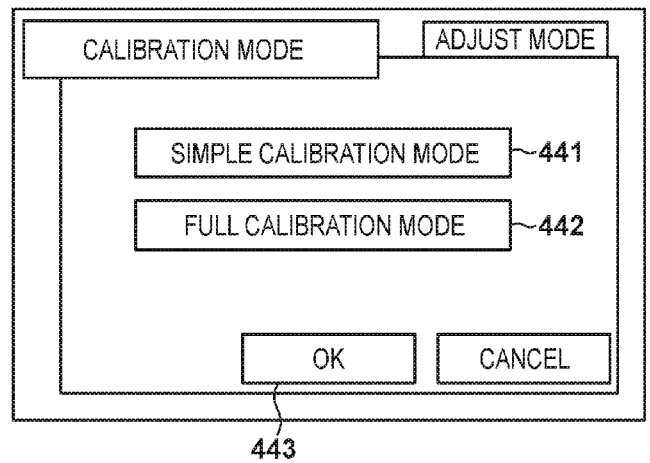

When a user, on the operation panel 180 (FIG. 2), selects the user mode button 411, a screen as in FIG. 15A is displayed on the liquid crystal display unit 406. When an adjustment button 421 in the screen of FIG. 15A is pressed, a screen as in FIG. 15B is displayed. Furthermore, when a calibration mode button 431 is selected, it is possible to perform a calibration for improving the stability of the chromaticity and the density of the output image as previously described. When the calibration mode button 431 is selected, a screen as in FIG. 15C is displayed on the liquid crystal display unit 406. When a simple calibration button 441 is selected, maximum density/tone correction control is performed. When a full calibration button 442 is selected, in addition to maximum density/tone correction control, the multi-order color CAL is performed. When, after the calibration mode is selected, an OK button 443 is pressed, the CPU 313 causes the calibration selected by the user to start.

Figure 14B:
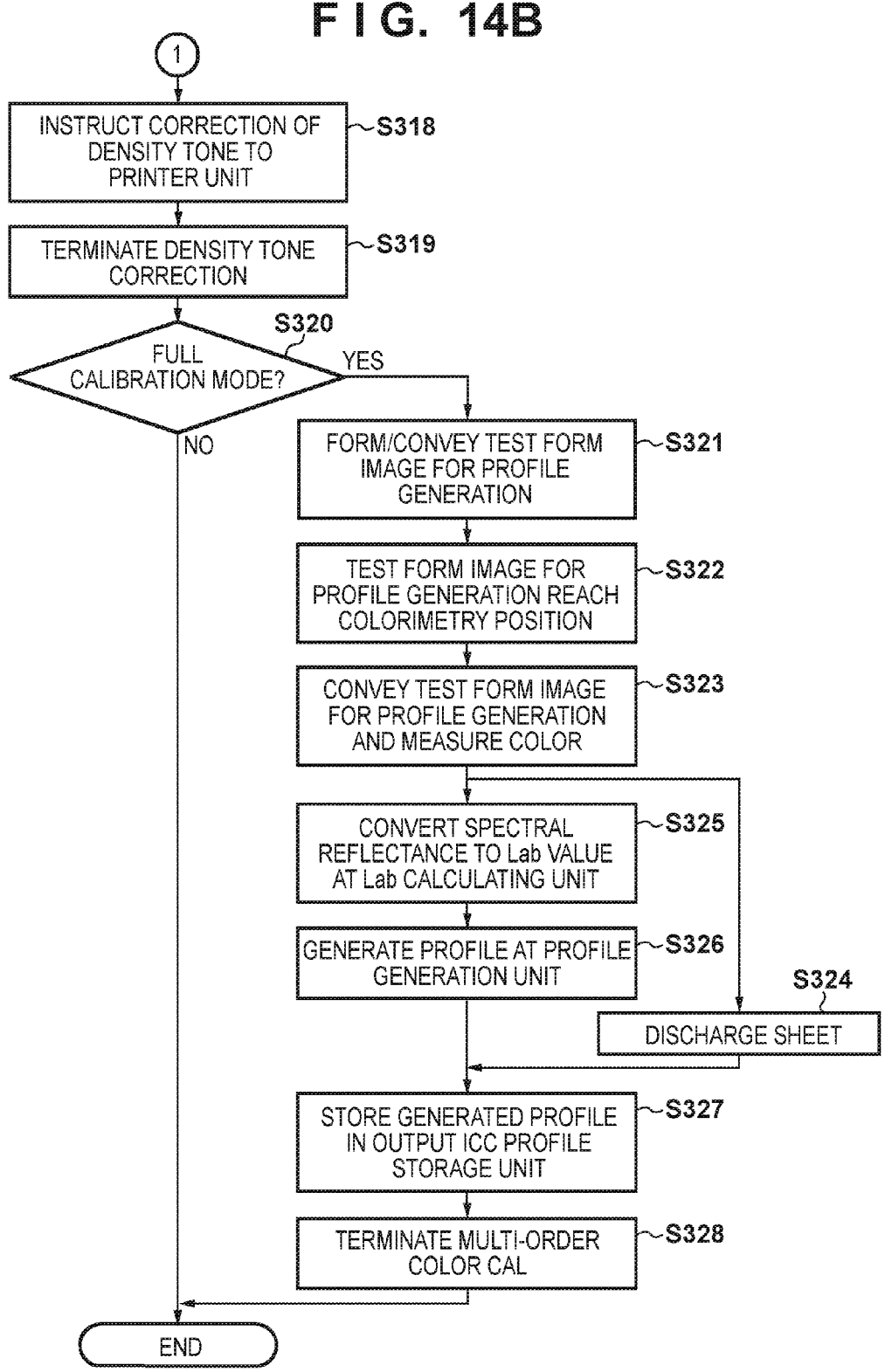

Using FIGS. 14A and 14B, an explanation is given of operation of the image forming apparatus 100 in a case where the execution of calibration is instructed. When, in the image forming apparatus 100, the calibration mode is started, the CPU 313, in step S301, causes the engine status confirmation unit 1102 to output to the printer unit 1201 measurement image data for outputting a test chart for obtaining density information in the current engine state. The printer unit 1201 forms on the recording material 110 a test form for a maximum density correction based on measurement image data. The engine control unit 102, by controlling a conveyance roller arranged on the conveyance path, causes the recording material 110 on which the test form for maximum density correction is formed to be conveyed towards the first fixing device 150.

In step S302, the engine control unit 102, after causing the test form for the maximum density measurement to be fixed to the recording material 110 by the first fixing device 150, causes the recording material 110 on which the test form for the maximum density measurement is fixed to be conveyed to a measurement position of the spectral sensor 200 by controlling the conveyance roller arranged on the conveyance path.

In step S303, the spectral sensor control unit 1123 causes measurement to be executed by the spectral sensor 200 while conveying the test form. When the measurement completes, the engine control unit 102, in step S304, controls the conveyance roller arranged on the conveyance path to discharge the test form out of the image forming apparatus 100.

In step S305, the spectral sensor control unit 1123 sends the result of the measurement by the spectral sensor 200 to the density converter 1130 as spectral reflectance data to convert the spectral reflectance data into density data at the density converter 1130. After that, the image forming apparatus 100 sends the density data of each color that is converted by the density converter 1130 to the maximum density correction unit 1131.

In step S306, the maximum density correction unit 1131 calculates correction amounts of image forming conditions such as the charge voltage, exposure intensity, and the developing voltage so as to achieve a desired target maximum density.

In step S307, the maximum density correction unit 1131 sends an instruction to correct the image forming conditions to the printer unit 1201. By this, in the printer unit 1201, the image forming conditions are updated based on the correction amounts determined by the maximum density correction unit 1131. Then, in step S308, the CPU 313 terminates the maximum density correction control.

When the maximum density correction control terminates, next the density tone correction control is transitioned to. When a tone control instruction is made, the CPU 313, in step S311, causes the engine status confirmation unit 1102 to output measurement image data for forming tone patterns of 16 tones for each color to the printer unit 1201. Note that the maximum density patches are included in the 16 tone patterns. The printer unit 1201 forms on the recording material 110 a test form (tone patterns of 16 tones) for density tone correction based on measurement image data. The engine control unit 102, by controlling a conveyance roller arranged on the conveyance path, causes the recording material 110 on which the test form for density tone correction is formed to be conveyed towards the first fixing device 150.

In step S312, the engine control unit 102, after causing the test form for density tone measurement to be fixed to the recording material 110 by the first fixing device 150, causes the recording material 110 on which the test form for density tone measurement is fixed to be conveyed to the measurement position of the spectral sensor 200 by controlling the conveyance roller arranged on the conveyance path. In step S313, the spectral sensor control unit 1123 causes measurement to be executed by the spectral sensor 200 while conveying the test form.

When the measurement completes, the engine control unit 102, in step S314, controls the conveyance roller arranged on the conveyance path to discharge the test form out of the image forming apparatus 100.

In step S315, the spectral sensor control unit 1123 sends the result of the measurement by the spectral sensor 200 to the density converter 1130 as spectral reflectance data to convert the spectral reflectance data into density at the density converter 1130. After that, the image forming apparatus 100 sends the density data of each 16 tone color that is converted by the density converter 1130 to the density tone correction unit 1132.

In step S316, the density tone correction unit 1132 calculates the γ LUT correction amounts so that the tone characteristics becomes ideal tone characteristics.

In step S317, the LUT generation unit 1133 generates the γ LUTs of each color based on the correction amounts calculated by the density tone correction unit 1132, and sends them to the LUT unit 1134. After the density tone correction control is executed, the tone correction unit 316 corrects the inputted image data based on the γ LUTs stored in the LUT unit 1134.

In step S318, the CPU 313 sends an instruction to the tone correction unit 316 so as to correct the image data using the γ LUTs. By this, in the tone correction unit 316, the γ LUTs are updated to correct the image data. Then, in step S319, the CPU 313 terminates the density tone correction control.

In step S320, the CPU 313 determines whether or not the selected calibration mode is the full calibration mode. In the screen of FIG. 15C, if the full calibration mode is selected as the calibration mode, transition is made to ICC profile generation processing. Meanwhile, if it is the simple calibration mode, this processing flow terminates. Accordingly, processing from step S321 is processing for when the full calibration mode is selected by the user. If it is the full calibration (YES in step S320), the CPU 313 advances processing to step S321, and if it is the simple calibration (NO in step S320), the CPU 313 causes this processing flow to terminate.

In step S321, the CPU 313 causes the engine status confirmation unit 1102 to output to the printer unit 1201 measurement image data for forming a test form for profile generation (81 patches) for generating the ICC profile. The printer unit 1201 forms on the recording material 110 a test form for profile generation (81 patches) based on measurement image data. The engine control unit 102, by controlling a conveyance roller arranged on the conveyance path, causes the recording material 110 on which the test form for profile generation is formed to be conveyed towards the first fixing device 150.

In step S322, the engine control unit 102, after causing the test form for profile generation to be fixed to the recording material 110 by the first fixing device 150, causes the test form for profile generation to be conveyed to the measurement position of the spectral sensor 200 by controlling the conveyance roller arranged on the conveyance path. In step S323, the spectral sensor control unit 1123 causes measurement to be executed by the spectral sensor 200 while conveying the test form. When the measurement completes, the engine control unit 102, in step S324, controls the conveyance roller arranged on the conveyance path to discharge the test form out of the image forming apparatus 100.

In step S325, the spectral sensor control unit 1123 sends the result measured by the spectral sensor 200 to a Lab calculation unit 1120 as spectral reflectance data. The Lab calculation unit 1120 converts the spectral reflectance data into L*a*b* data. Furthermore, the converted L*a*b* data is inputted into the profile generation unit 1122.

In step S326, the profile generation unit 1122 generates the ICC profile based on the L*a*b* data and the CMYK signal values, and the L*a*b* data and the CMYK signal values of the 928 patches which are the ISO 12642 test form stored in advance.

In step S327, the profile generation unit 1122 stores in the output ICC profile storage unit 1113 the generated ICC profile. In step S328, the CPU 313 terminates the multi-order color CAL control.

By the above, color mapping having stability of image density/tonality, multi-order color tint stability, and high precision becomes possible in the image forming apparatus after the calibration terminates.

[Difference Between Chromaticity Detection and Density Detection]

Next, explanation will be given of a difference between a measurement condition at a time of density detection and a measurement condition at a time of a chromaticity detection.

(Chromaticity Detection)

First, explanation is given for the chromaticity detection. For the chromaticity detection, L*a*b* data is calculated using a calculation as previously described, but a pre-scan operation is performed to calculate the L*a*b* data at a high precision. The pre-scan is an operation to determine the measurement conditions of the sensor in the previously described multi-order color CAL. Meanwhile, in this specification, a scan for performing a measurement of images for measurement using the measurement condition obtained based on the measurement result of the pre-scan is referred to as a "main scan" or an "actual scan". The measurement condition is an accumulation setting (accumulation time) of the sensor at the time of the main scan. For high precision profile generation, it is necessary to measure patch images based on appropriate accumulation settings (accumulation time).

Accumulation time t(s): the measurement time necessary for the line sensor 203 to appropriately receive reflected light from the patch.

As the accumulation setting, there are three stages having different accumulation times, for example, and the accumulation time for one measurement is set as follows.

Accumulation setting 1: 3 ms
Accumulation setting 2: 6 ms
Accumulation setting 3: 12 ms In the foregoing accumulation setting, patches whose density is thick (dark portions) and patches whose density is thin (bright portions) of FIG. 10, for example, are compared. In FIGS. 19A and 19B, the ordinate axis indicates the signal value corresponding to the intensity (the reflected light amount) of the reflected light detected by the line sensor 203 in the case where the accumulation setting (time) is caused to change. Note that the signal value of the line sensor 203 is a value obtained by subtracting a dark signal value. In FIGS. 19A and 19B, the abscissa axis is something that converts each pixel of the line sensor 203 into a wavelength.

In FIG. 19A, the patch whose patch number 81 is set as a dark portion patch, and the reflected light amount from the patch in each of the above described accumulation times is indicated. In FIG. 19B, the patch whose patch number 13 is set as a bright portion patch, and the reflected light amount from the patch in each of the above described accumulation times is indicated.

According to FIGS. 19A and 19B, in the dark portion patch whose patch number is 81, when the accumulation times are increased in order as the accumulation settings 1, 2 and 3, the signal values corresponding to the reflected light amounts also increase. In this case, it is possible to determine that the accumulation setting 3 is appropriate. Here, because the occupation ratio of the noise component becomes larger in relation to the signal value outputted from the line sensor 203 in a case when the intensity of the reflected light received by the line sensor 203 is small, it is necessary to cause the accumulation time to increase so that a larger dynamic range can be achieved.

Meanwhile, with the bright portion patch of patch number 13, it can be determined that the accumulation setting 1 for which the accumulation time is relatively short is appropriate. With the accumulation setting 2, it can be seen that wavelengths of about 600 nm or more become level in a proximity where the signal value corresponding to the reflected light amount is 3500. With the accumulation setting 3, it can be seen that wavelengths of about 500 nm or more become level in a proximity where the reflected light amount is 3500. This is because signal values that the line sensor 203 can output are restricted to 4096, and when the dark signal value is further subtracted, a limit value is exceeded (saturation) in a proximity of 3500. In other words, in bright portion patches such as patch number 13, the accumulation setting 1 for which the accumulation time is caused to be reduced is appropriate.

Based on the above, it is necessary to determine the appropriate accumulation setting in order to detect multi-order color patches (images for measurement) at a high precision.

In particular, a color matching function used when calculating L*a*b* data (FIG. 9) is a sensitivity function corresponding to the entirety of the measurement wavelength range. For this reason, when saturation occurs, it is impossible to obtain the L*a*b* data at high precision. For this reason, the pre-scan work is very important. In the pre-scan operation, it is necessary to optimize the accumulation settings of the line sensor 203.

Above, only patches for which the density is thick and patches for which the density is thin are explained, but limitation is not made to this. The tint of the patch may be made to vary depending on environmental condition such as the temperature, the humidity, or the like, or output conditions such as an the number of print characters, or the like. Accordingly, the pre-scan becomes necessary to generate a high precision profile.

Note that the pre-scan is a step for determining the accumulation settings prior to actually measuring the patches. When actually measuring the patches, measurement with the determined accumulation settings is performed a plurality of times in order average out minute non-uniformity in the surface of the patches to raise the measurement accuracy. Explanation is given later for a step (actual scan) in which the pre-scan is terminated, and a measurement of the images for measurement for the patches is actually performed using the accumulation settings determined as the accumulation settings for the main scan.

(Pre-Scan Timing and Accumulation Setting Determination)

Figure 17:
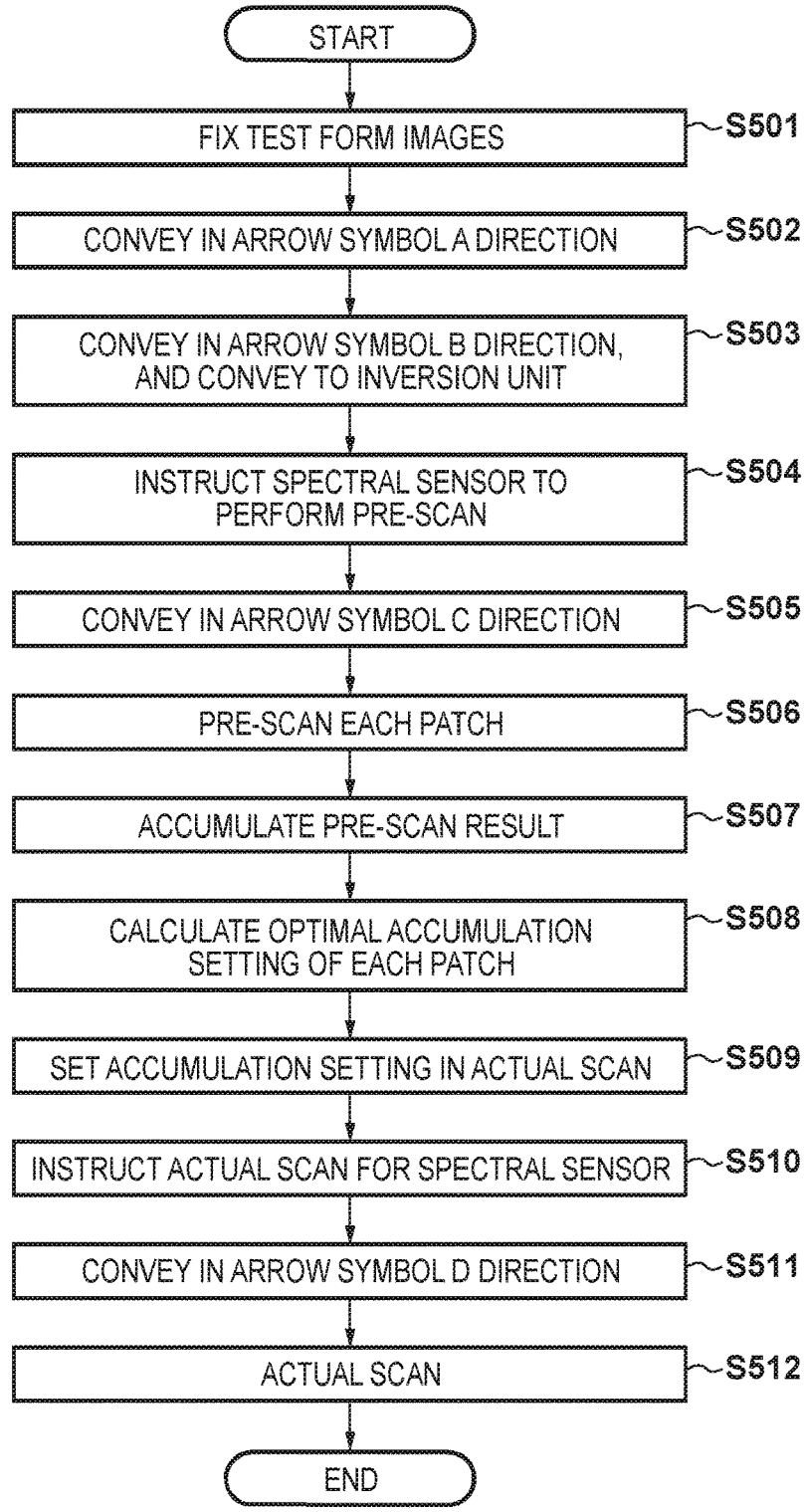
FIG. 17 is a flowchart upon pre-scan according to the first embodiment.

Next, processing for determining the timing for performing the pre-scan, and the accumulation settings is explained using FIG. 1, FIG. 5, and FIG. 17.

In step S501, the CPU 313 causes the printer unit 1201 to form multi-order color images for measurement for profile generation on the recording material 110. Here, the multi-order color images for measurement are caused to be fixed on the recording material 110 by the first fixing device 150. The recording material 110 on which the multi-order color images for measurement are fixed is referred to as a test form for profile generation.

In step S502, the CPU 313 causes the test form for profile generation by the printer unit 1201 to be conveyed in the arrow symbol A direction illustrated in FIG. 1.

In step S503, the CPU 313 causes the test form for profile generation by the printer unit 1201 to be conveyed in the arrow symbol B direction illustrated in FIG. 1. The test form for profile generation is conveyed to the inversion unit 136.

In step S504, the CPU 313 outputs a signal for causing the spectral sensor control unit 1123 to execute the pre-scan.

In step S505, the CPU 313 causes the test form for profile generation by the printer unit 1201 to be conveyed in the arrow symbol C direction illustrated in FIG. 1. When the test form for profile generation passes the measurement position of the spectral sensor 200, the spectral sensor control unit 1123 causes the pre-scan to be executed by the spectral sensor 200 in step S506. In a case when the pre-scan is executed, the white LED 201 irradiates light onto the test form for profile generation, and reflected light from each of the multi-order color images for measurement is received by the line sensor 203. This pre-scan causes the measurement condition to vary sequentially from the accumulation setting 1 to the accumulation setting 3, and measures the intensity of reflected light from the patches by the line sensor 203 based on each accumulation setting. Based on the results of the measurement (accumulation time and reflected light intensity), the CPU 313 can obtain a reflected light amount from the patches from the sum total of the signal values of each pixel (light receiving element) of the line sensor 203.

When the pre-scan once finishes for all of the patches, the image forming apparatus 100, in step S507, transmits the result of measurement by the spectral sensor 200 to a sensor setting processing unit 1140. Here, the sensor setting processing unit 1140 is configured to include a pre-scan result storage unit 1141, an accumulation setting determination unit 1142, and an actual scan accumulation setting storage unit 1143. The measurement result is stored in the pre-scan result storage unit 1141.

In step S508, the accumulation setting determination unit 1142 performs a saturation determination as to whether the measurement result stored in the pre-scan result storage unit 1141 does not exceed a threshold value. The measurement result here corresponds to the reflected light amount measured by the line sensor 203. Furthermore, the accumulation setting determination unit 1142 determines optimal accumulation settings such that a maximum dynamic range can be achieved in a range where the reflected light amount does not exceed the threshold value. Here, the accumulation setting determination unit 1142 functions as a determination unit for determining the accumulation time.

In step S509, the accumulation setting determination unit 1142 stores the accumulation setting for each patch in the actual scan accumulation setting storage unit 1143.

After the pre-scan is executed, the CPU 313, in step S510, reads the accumulation settings stored in the actual scan accumulation setting storage unit 1143, and outputs the accumulation time of each patch and a signal for causing the spectral sensor control unit 1123 to execute an actual scan.

In step S511, the CPU 313 causes the test form for profile generation by the printer unit 1201 to be conveyed in the arrow symbol D direction of in FIG. 1. Here, for the test form for profile generation, the conveyance direction is inverted in the inversion unit 136, and conveyance to the conveyance path 135 is performed.

When the test form for profile generation which is conveyed in the arrow symbol D direction on the conveyance path 135 passes the measurement position of the spectral sensor 200, the spectral sensor control unit 1123, in step S512, causes the actual scan to be executed by the spectral sensor 200 based on the accumulation settings determined in the pre-scan.

(Averaging Process Count at Time of Actual Scan)

Next, explanation of a measurement count at a time of actual scanning (hereinafter referred to as averaging process count). The averaging process count is performed is the number of times sampling for each of the patches is performed. Density non-uniformity of patches can be suppressed by averaging signal values of each pixel when the spectral sensor 200 measures patches based on the averaging process count. It is possible to cause measurement accuracy to improve by optimizing the averaging process count. For the setting of the averaging process count, three stages of four times, eight times and sixteen times are arranged, and an appropriate value is set for each patch.

In FIG. 18, the relationship between color differences and the averaging process count for patches of eight colors—yellow, cyan, magenta, black, white, red, green, and blue—is illustrated. The ordinate axis indicates a color difference ΔE between values for which accumulation times are optimized for each of patches of eight colors and each patch is measured in a stationary state, and values measured while conveying each patch. The abscissa axis indicates the number of times each patch is measured (averaging process count). Note that in FIG. 18, for comparison, color difference data for when the averaging process count is two times is also illustrated.

As illustrated in FIG. 18, when the averaging process count is increased, the color difference ΔE between the result of measuring in the stationary state and the result of measuring while conveying becomes smaller. Specifically this indicates that the measurement accuracy is of improved precision when the averaging process count is increased.

Also, it can be seen that for low brightness patches such as black (K) and blue (B), as compared to other high brightness patches, the amount of change of color difference between averaging process counts of eight times and sixteen times is small. Here, because for low brightness patches, the foregoing accumulation time setting is large, the region measured in the first place is large compared to other patches. For this reason, for low brightness patches, it is easy to detect at a high precision even if the averaging process count is small.

Appropriate averaging process counts in relation to each accumulation setting, which are for performing validation as described above for a large number of patches including 81 patches for multi-order color correction, and detecting patches at high precision, are set as in Table 1.

TABLE 1

| accumulation setting | averaging process count |
|---|---|
| 1 | 16 |
| 2 | 16 |
| 3 | 8 |

(Multi-Order Color CAL Patch Arrangement)

The size of patches is determined considering a measurement speed (mm/s), an accumulation setting t(s) at a time of measurement, the averaging process count N (times), and a margin in relation to an unstable region of the image also.

(Size of patch)≥$P.S.$×(accumulation time $t$)× (averaging process count $N$)

P.S. (mm/s): The speed at which the printing material on which the patch is formed is conveyed Accumulation time t(s): the measurement time necessary for receiving reflected light from a patch in the first measurement by the line sensor 203

Averaging process count N(times): the number of times that it is necessary to measure in order to suppress density non-uniformity in each patch.

Here, it is assumed that, for example, P.S.=250 mm/s. The times needed to measure each patch, from the relationship in Table 1 are:

(accumulation setting 1)=3 ms*16=48 ms (accumulation setting 2)=6 ms*16=96 ms (accumulation setting 3)=12 ms*8=96 ms and therefore the maximum measurement time is 96 ms. Accordingly, the size of the patch needs to be 250* 0.096=24 mm or more.

Considering a margin in relation to an unstable region of the image in the patch to be about ±2 mm in each patch, the length of a patch is assumed to be 28 mm in the sub scanning direction (the direction in which the recording material 110 is conveyed) (the length of a patch in the main scanning direction is, for example, 40 mm). Also, the spectral sensor 200 are arranged at the 4 different positions in a direction orthogonal to the direction of conveyance. An overview of a patch arrangement is illustrated in FIG. 16. Note, the patch arrangement may be changed in accordance with the configuration of the image forming apparatus 100 or the arrangement of the spectral sensor 200.

(Density Detection)

Next, explanation is given for density detection. Density values are calculated using the previously described calculation, but unlike the chromaticity detection, a pre-scan operation is not performed for density detection. The reason for this is explained.

Figure 20:
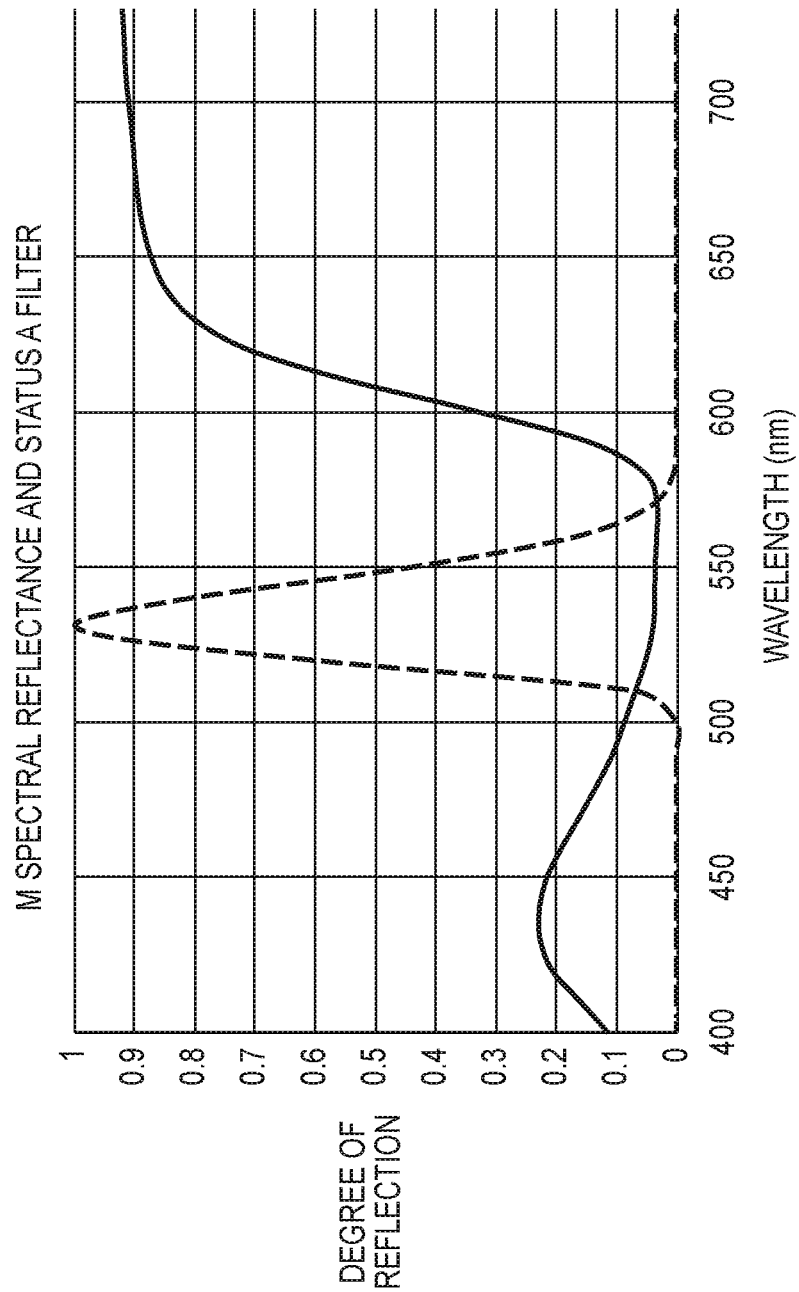
FIG. 20 is a view that illustrates a relationship between a spectral reflectance and a filter upon a density calculation according to the first embodiment.

Firstly, a filter as illustrated in FIG. 20 is used upon the density calculation. In FIG. 20, the ordinate axis indicates a degree of reflection and the abscissa axis indicates a wavelength. For example, an explanation is given for a magenta patch as an example using FIG. 20. The solid line in FIG. 20 indicates the spectral reflectance of magenta with a density of approximately 1.4. In a case where a density calculation is performed for this spectral reflectance, the filter illustrated with the dotted line in FIG. 20 (here, a status A filter) is used. In this case, there is no influence on a density calculated value in a portion in which the wavelength range is equal to or lower than 500 nm and greater than or equal to 600 nm. That is, in a case where a density of magenta is obtained, even if a degree of reflection is high for a light absorbing portion (wavelength) where a reflected light from the magenta is small, and a saturation arises in a signal value of this light absorbing portion (wavelength), a probability of misdetecting the density value is low because the signal value of this light absorbing portion (wavelength) is not used for the calculation.

Here, explanation is given for the maximum density correction control. The maximum density correction control is a control for determining a maximum density used in the image forming apparatus, and generates a plurality of patches with comparably high densities that are close to a desired density, and determines image forming conditions (i.e. a potential setting, an exposure setting, and an image development setting). At this time, a saturation does not arise even in a situation where a maximum density correction is required (i.e. when the maximum density changed) because the degree of reflection of a light absorbing portion of the spectral reflectance described above of high density patches is low. Accordingly, a pre-scan is not performed and the accumulation setting is set to a fixed time. Note, the accumulation setting for the time of the density detection is stored in the program ROM 304 in advance. Here, the program ROM 304 corresponds to a storage unit in which the first measurement condition is stored.

Next, explanation is given for tone correction control. Tone correction control is control for correcting tone characteristics for each color of the image forming apparatus, and is control for forming high to low density patches to understand and correct the tone characteristics of the engine. As described above, the influence of saturation is small upon density detection. Therefore, in regards to higher density region to lower density region patches for obtaining the tone characteristics, the tone characteristic can be understood at high precision by setting an appropriate fixed accumulation setting so that the light absorbing portion does not to cause saturation in spectral reflectance. Accordingly, a downtime at a time of density detection can be suppressed by setting the measurement condition to a fixed condition without executing the pre-scan upon the density detection. Furthermore, in a case where a full calibration is executed, the downtime can be suppressed compared with a configuration in which the pre-scan is executed in both the maximum density/tone correction and the multi-order color CAL.

(Patch Arrangement at a Time of Maximum Density/Tone Correction Control)

A patch (image for measurement) arrangement corresponding to the previously described measurement condition upon the maximum density/tone correction control is considered.

Firstly, the accumulation setting may be set in a range where saturation is not caused by the light absorbing portion in the spectral reflectance in order to measure patches of comparably high density regions at the time of the maximum density correction control. However, the accumulation setting is set to the above described accumulation setting 2 because a region used for a calculation portion, for example a region in 500 nm-510 nm in FIG. 20, is influenced in a case where an extremely large saturation occurs. Here, the size of the patch needs to be 250*0.096=24 mm or more.

Figure 21:
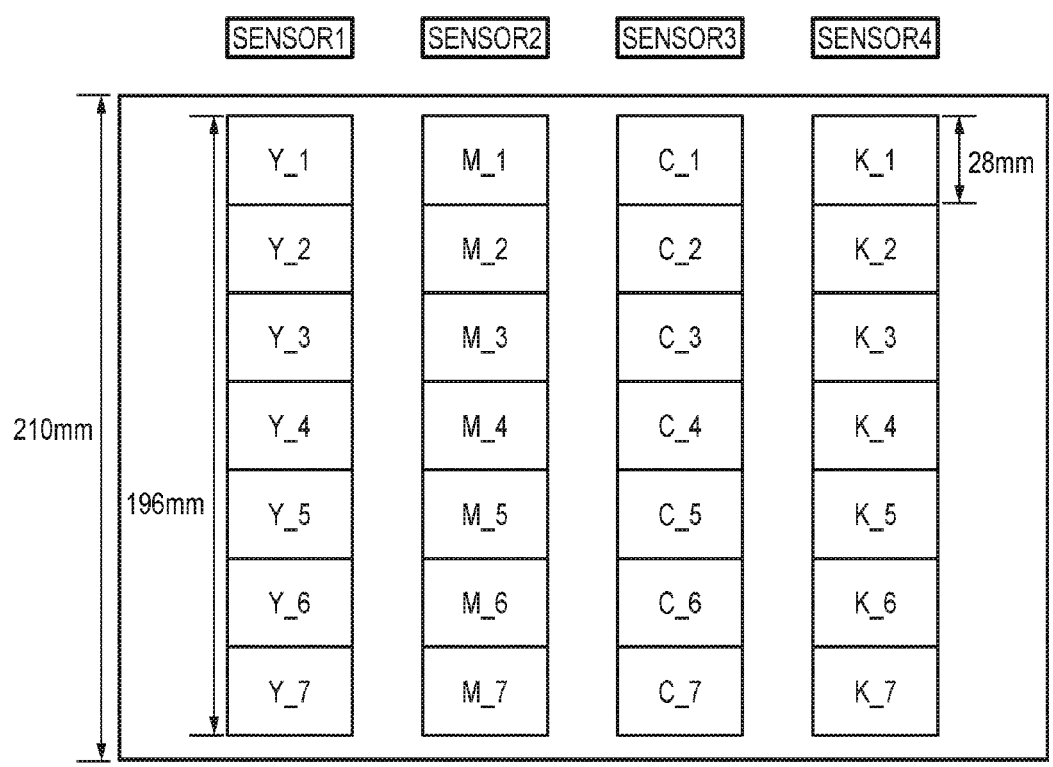
FIG. 21 is a view that illustrates an example of a patch arrangement upon a maximum density detection according to the first embodiment.

In the present embodiment, a margin with respect to an image unstable region in a patch is considered to be approximately ±2 mm in each patch, and so the size of a patch is assumed to be 28 mm in the sub scanning direction (40 mm in the main scanning direction). An overview of a patch arrangement, where A4 paper is used for the calibration, is illustrated in FIG. 21. In the present embodiment, the number of patches in the maximum density correction control is set to seven tones and the image forming condition with respect to target density is determined.

Next, a patch arrangement upon tone correction control is explained. A patch of higher density region and a patch of lower density region are used upon tone correction control, and an accumulation setting is determined in a range where a large saturation is not caused in relation to each patch.

Here, an accumulation setting 1 is set as the accumulation setting for a lower density region and an accumulation setting 2 is set for a higher density region. The patch of the accumulation setting 1 needs 250*0.048=12 mm or more. Consider a margin in relation to an unstable region of the image in the patch of about ±2 mm for each patch, the length of a patch in the sub scanning direction (the conveyance direction) is assumed to be 16 mm (the length of a patch in a direction orthogonal to the conveyance direction is assumed to be 40 mm, for example.). Also, the patch of the accumulation setting 2 is set to 28 mm as previously described. Fixed accumulation times illustrated in FIG. 22 are set for tone patterns of sixteen tones, and a patch arrangement as illustrated in FIG. 23 is performed. Note, the accumulation times and the patch arrangement at the time of the maximum density/tone correction are only one example, and limitation is not made to this. For example, the size of a patch is changed in accordance with a conveyance time of a sheet, a luminescence intensity of a white LED or the like.

It is necessary to perform tone correction control for each dither (content of pseudo halftone processing) used normally. There are, for example, 3 types of dither types: a dither for a low number of lines, a dither for a high number of lines, and an error diffusion. Accordingly, the maximum density correction control and the tone correction control are combined, and seven calibration patches arranged on the recording material 110 are measured. There is a time shortening effect of a calibration of approximately 20 seconds because measurement is performed with a fixed accumulation setting determined in advance without performing the pre-scan at the time of density detection.

Therefore, as explained in the present embodiment, the measurement is performed using a fixed accumulation setting determined in advance at a time of density detection. On the other hand, the pre-scan is performed before the main measurement at the time of the chromaticity detection, and measurement is performed after the accumulation setting for the main measurement is determined. Thereby, it becomes possible to perform a high precision measurement at a time of a density detection and a chromaticity detection, and it becomes possible to shorten the time of a calibration as much as possible.

Also, by performing a pre-scan step when needed as in the present embodiment, a total duration of an exposure of a spectral sensor that is used can be shortened, leading to the white LED 201 having a longer lifetime.

<Second Embodiment>

In a second embodiment, a method for more finely understanding tone characteristics at a time of density detection is explained. Note, other image forming conditions and measurement conditions are similar to the first embodiment.

A tone characteristic of an engine is calculated using a correspondence relationship between an input image signal value and a density value detected by measuring a patch corresponding to the signal. Here, in regards to signal values for which a patch is not outputted, the γ property of the engine is calculated by interpolating between the detected density values. Also, particularly on the side of highlights, it is necessary to know, as an actual engine, from which input signal level it is possible to start to write an image. That is, in order to more finely understand the tone characteristic, it is desirable to obtain as many tonal densities as possible.

On the other hand, for time shortening of a calibration, it is necessary to reduce a sheet number used for a calibration.

Accordingly, in the present embodiment, the tone levels which can be obtained are caused to increase by increasing the number of patches by setting all of accumulation settings at the time of the density detection of the patches used in tonal density control to the accumulation setting 1.

Firstly, in the maximum density correction control, the maximum density value is determined using the same method as in the first embodiment in order to detect high density areas with a high precision. Next, transition to a tonal density correction control is made.

A relation between patch signal levels and accumulation time obtained in tonal density correction control is illustrated in FIG. 24. In FIG. 25, an example of a patch arrangement is illustrated. As illustrated in FIG. 25, the number of patches which can be obtained is 24 tones for one color. Here, patches are outputted across 2 sheets and 12 patches are outputted for each color in 1 sheet.

Figure 26:
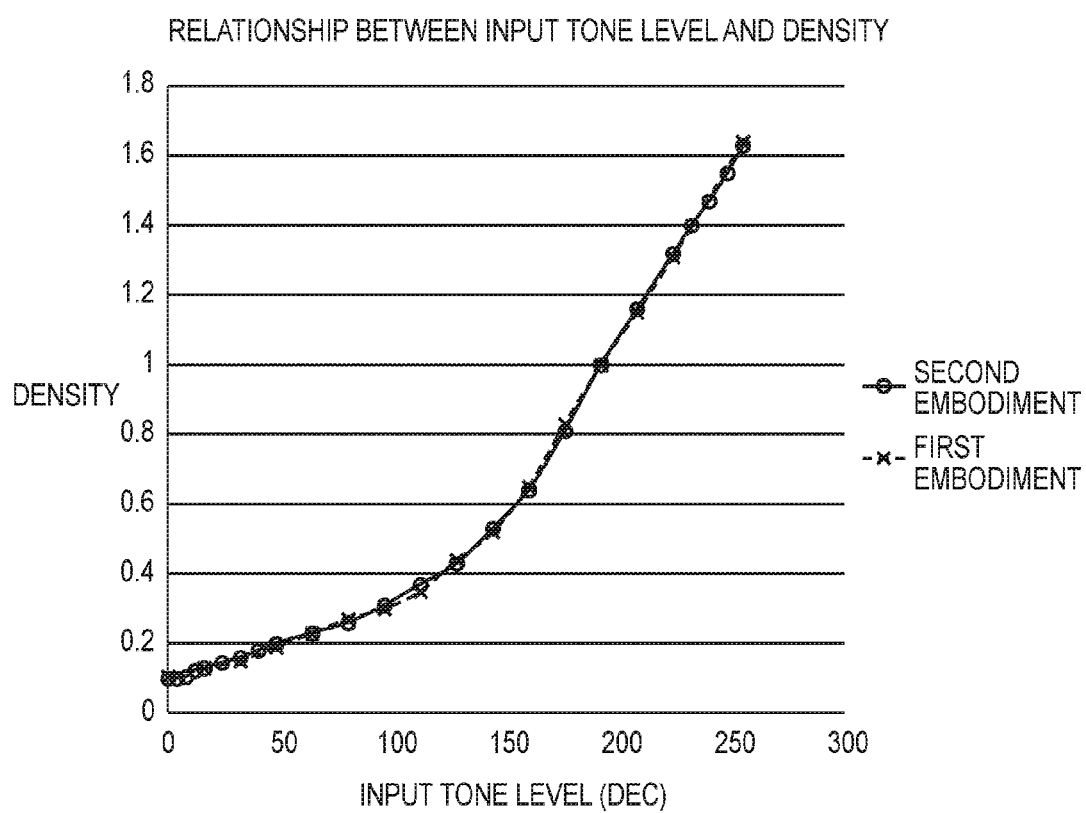
FIG. 26 is a view that illustrates a relationship between an input tone level and a density according to the second embodiment.

Also, tone characteristics obtained by the present embodiment is illustrated in FIG. 26. Also, the tone characteristics obtained in the first embodiment are illustrated for a comparison. In FIG. 26, the ordinate axis indicates a measured density, the abscissa axis indicates an input tone level.

As illustrated in FIG. 26, it is understood that the tone characteristics can be understood sufficiently even in the configuration of the first embodiment. Furthermore, by using the configuration of the second embodiment and increasing the obtainment areas of higher density regions and lower density regions, the tone characteristics can be understand more accurately.

In the present embodiment, the obtainment areas of higher density regions are increased. A ratio of a tone fluctuation in relation to input signal levels on the side of higher density regions often varies if an engine state and the environment change, so the configuration of the present embodiment is very effective. Also, the number of points of lower density regions is increased. By this, it is easy to determine from which input signal level writing of the image is actually possible.

Also, in the present embodiment, the obtainment areas on the sides of higher density regions and lower density regions are increased, but limitation is not made to this, and it is possible to appropriately change this as necessary. For example, configuration may be taken to increase them so that the input tone levels have equal intervals. In a case where it is desired that a halftone tone characteristic be understood especially, the obtainment area of an HT region may be increased.

Also, the accumulation setting is fixed to the accumulation setting 1 in the present embodiment, but limitation is not made to this. For example, it is possible to use a means for calculating higher density region densities at higher precision by using a method such as using FFH numeric values obtained precisely upon the maximum density correction, and offsetting FFH values, or correcting by calculating an average.

By the present embodiment, measurement is performed with a fixed accumulation setting determined in advance for a time of density detection, the accumulation setting is set to be larger for a higher density region detection for a time of maximum density correction control, and the accumulation setting is set to be smaller to increase the number of tones that are obtained at a time of the tonal density correction control. By this, a stabilization of higher density regions and an increase in fineness of tonality becomes possible.

<Third Embodiment>

In the third embodiment, a method for detecting a density of higher density regions of K accurately at a time of density detection is explained. Note, other image forming conditions or measurement conditions are similar to the first embodiment.

There are many cases where a reproducibility a character/fine line or a density of a black monochrome is required for a black image. Therefore, there are many cases where a density of black monochrome is set higher than a color density in the image forming apparatus.

Accordingly, in the present embodiment, the accumulation time of black is set to be longer than that of color so that a density detection with a high precision is possible for the maximum density correction control of the black for which the density is set to be higher than for color.

In FIG. 27, accumulation settings at a time of maximum density correction control for color and black are illustrated. Additionally, the accumulation settings at a time of subsequent tonal density correction control and multi-order color CAL are illustrated. Note, the settings are performed so that the maximum density of color is 1.45 and the maximum density of black is 1.70 at this time. As illustrated in FIG. 27, while the accumulation setting of color (CMY) is set to the accumulation setting 2 at a time of maximum density correction, the accumulation setting of black (K) is set to the accumulation setting 3. Accordingly, a longer accumulation time is set for black. On the other hand, upon tonal density correction, both are set to the same accumulation setting (accumulation setting 1).

An example of the spectral reflectance obtained upon the maximum density correction control of black is illustrated in FIG. 28. In FIG. 28, the ordinate axis indicates a spectral reflectance and the abscissa axis indicates a wavelength.

Figure 8B:
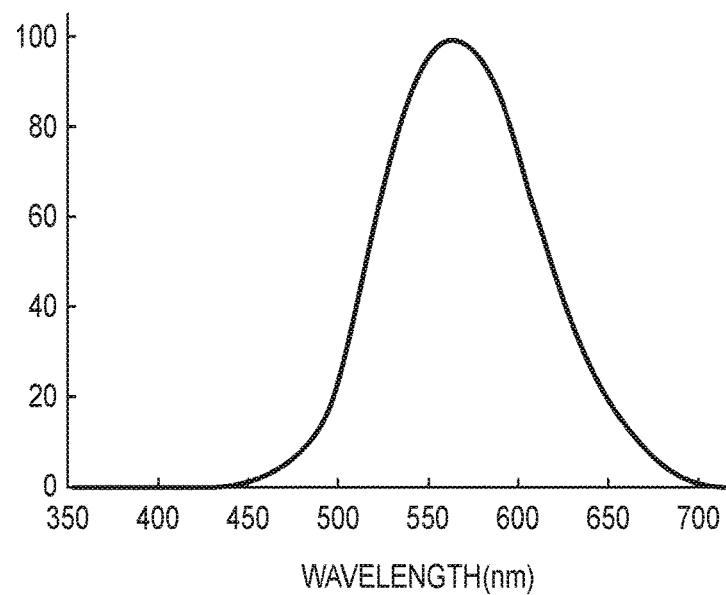

As illustrated in FIG. 28, the spectral reflectance obtained near the maximum density region of black is very low across the entire wavelength range and a saturation does not occur even if the accumulation setting is raised. A filter spanning the entire range of wavelengths as illustrated in FIG. 8B is used at a time of density calculation of black, but the spectral reflectance of black is flat across the entire range of wavelengths and saturation does not occur at a portion. Also, the dynamic range is not ensured and the precision becomes worse if the accumulation setting becomes lower, because an intensity of a reflected light detected by the sensor is itself very low.

Therefore, by the present embodiment, when the density of black is detected at the time of maximum density correction control, a black density can be detected with a higher precision by setting the accumulation time to be longer than the accumulation setting in the case of detecting the density of color.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-163093, filed Aug. 20, 2015, which is hereby incorporated by reference herein in its entirety.

What is claimed is:

1. An image forming apparatus comprising:
a plurality of image forming stations configured to form a measurement image on a sheet;
a fixing device configured to fix the measurement image on the sheet by heating the measurement image formed by the plurality of image forming stations;
a color sensor, provided on downstream of the fixing device in a conveyance direction of the sheet, configured to measure the measurement image on the sheet; and
a controller configured to:
control the plurality of image forming stations to form the measurement image on the sheet,
control the fixing device to fix the measurement image on the sheet,
perform a pre-scan for measuring the measurement image by the color sensor in order to determine a measurement condition for a main scan, wherein the measurement condition for the main scan is determined based on a measurement result of the measurement image by the pre-scan,
perform the main scan for measuring the measurement image by the color sensor based on the measurement condition for the main scan, and
detect spectral data of the measurement image based on a measurement result by the main scan,
wherein, in a case where density data of the measurement image is detected, the controller performs another main scan for measuring the measurement image by the color sensor based on a measurement condition for density detection without performing the pre-scan.

2. The image forming apparatus according to claim 1, wherein the measurement condition for the main scan includes an accumulation time of a reflected light from the measurement image.

3. The image forming apparatus according to claim 1, wherein
the measurement image for the main scan includes a first measurement image and a second measurement image, and
the color sensor measures a reflected light from the first measurement image based on a first accumulation time and measures a reflected light from the second measurement image based on a second accumulation time different from the first accumulation time.

4. The image forming apparatus according to claim 1, further comprising:
an image processor configured to perform color conversion processing to image data based on a conversion condition,
wherein the controller generates the conversion condition based on the spectral data, and
wherein the plurality of image forming stations form an output image based on the converted color image data.

5. The image forming apparatus according to claim 1, further comprising:
an image processor configured to correct image data based on a tone correction condition,
wherein the controller generates the tone correction condition based on the density data, and
wherein the plurality of image forming stations form an output image based on the corrected image data.

6. The image forming apparatus according to claim 1, wherein the color sensor comprises:
a diffraction grating configured to disperse light reflected from the measurement image, and
a line sensor configured to receive light dispersed by the diffraction grating.

7. The image forming apparatus according to claim 4, wherein the conversion condition is a color profile.

8. The image forming apparatus according to claim 5, wherein the tone correction condition is a gradation correction table.

9. The image forming apparatus according to claim 2, wherein the accumulation time corresponds to a time in which the color sensor continuously receives a reflected light from the measurement image.

10. The image forming apparatus according to claim 1, wherein the controller conveys the sheet to the color sensor before the pre-scan is performed, and conveys the sheet to the color sensor again before the main scan is performed.

11. The image forming apparatus according to claim 1, wherein the controller conveys the sheet to the color sensor before the pre-scan is performed, and inverses the conveyance direction of the sheet by performing switchback of the sheet, and conveys the sheet to the color sensor again before the main-scan is performed.

* * * * *